United States Patent
Lee

(10) Patent No.: US 12,060,078 B2
(45) Date of Patent: Aug. 13, 2024

(54) MERGING LiDAR INFORMATION AND CAMERA INFORMATION

(71) Applicant: Motional AD LLC, Boston, MA (US)

(72) Inventor: Jong Ho Lee, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 181 days.

(21) Appl. No.: 17/118,466

(22) Filed: Dec. 10, 2020

(65) Prior Publication Data

US 2022/0185324 A1 Jun. 16, 2022

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/09* (2013.01); *B60W 30/0956* (2013.01);
(Continued)

(58) Field of Classification Search
CPC ............ B60W 60/0015; B60W 30/09; B60W 30/0956; B60W 2420/42; B60W 2420/52; B60W 2555/60; B60W 2554/4041; B60W 40/02; B60W 40/10; B60W 60/001; B60W 2050/0005; B60W 2050/0052; G01S 17/894; G01S 7/4802; G01S 17/42; G01S 17/87; G01S 17/931; G01S 17/08;
(Continued)

(56) References Cited

U.S. PATENT DOCUMENTS 10,388,153 B1 * 8/2019 Swaminathan .... G06V 10/7715
2006/0222207 A1 10/2006 Balzer et al.
(Continued)

FOREIGN PATENT DOCUMENTS

CA 3026667 A1 * 1/2019 ............ B60W 30/08
CA 3026667 C * 9/2020 ............ B60W 30/08
(Continued)

OTHER PUBLICATIONS

Shahian Jahromi, Babak, Theja Tulabandhula, and Sabri Cetin. "Real-time hybrid multi-sensor fusion framework for perception in autonomous vehicles." Sensors 19.20 (2019): 4357. (Year: 2019).*
(Continued)

*Primary Examiner* — Russell Frejd
*Assistant Examiner* — Ana D Thomas
(74) *Attorney, Agent, or Firm* — Fish & Richardson P.C.

(57) ABSTRACT

Among other things, techniques are described for merging LiDAR information and camera information for autonomous annotation. The techniques include a vehicle that includes at least one LiDAR device configured to detect electromagnetic radiation; at least one camera configured to generate camera information of objects proximate to the vehicle; at least one computer-readable media storing computer-executable instructions; at least one processor communicatively coupled to the at least one LiDAR device and the at least one camera and a control circuit communicatively coupled to the at least one processor, wherein the control circuit is configured to operate the vehicle based on a location of the object.

22 Claims, 21 Drawing Sheets

(51) Int. Cl.
   *B60W 30/095* (2012.01)
   *G01S 17/894* (2020.01)
   *G06F 18/25* (2023.01)
   *G06V 20/56* (2022.01)
(52) U.S. Cl.
   CPC .......... *G01S 17/894* (2020.01); *G06F 18/251* (2023.01); *G06V 20/56* (2022.01); *B60W 2420/403* (2013.01); *B60W 2420/408* (2024.01); *B60W 2555/60* (2020.02)
(58) Field of Classification Search
   CPC .......... G01S 17/86; G01S 17/88; G01S 17/89; G06K 9/6289; G06V 20/56; G06V 10/803; G06V 20/58; G06V 20/584; H04N 5/2257; H04N 7/18
   See application file for complete search history.

(56) References Cited

U.S. PATENT DOCUMENTS

| | | | | |
|---|---|---|---|---|
| 2010/0100268 | A1* | 4/2010 | Zhang | G06V 20/584 701/25 |
| 2017/0124781 | A1 | 5/2017 | Douillard et al. | |
| 2017/0217394 | A1 | 8/2017 | Shima et al. | |
| 2018/0190046 | A1 | 7/2018 | Levinson et al. | |
| 2018/0307925 | A1* | 10/2018 | Wisniowski | G06T 7/73 |
| 2019/0138822 | A1 | 5/2019 | Yao et al. | |
| 2019/0258878 | A1* | 8/2019 | Koivisto | G01S 7/417 |
| 2021/0086358 | A1* | 3/2021 | Northcutt | B25J 9/1697 |
| 2022/0128701 | A1* | 4/2022 | Alghanem | G01S 17/894 |
| 2022/0156576 | A1* | 5/2022 | Rasouli | G06N 3/045 |
| 2022/0165304 | A1* | 5/2022 | Naphade | G06N 3/04 |

FOREIGN PATENT DOCUMENTS

| | | |
|---|---|---|
| CN | 111857905 | 10/2020 |
| JP | 2012-141740 | 7/2012 |
| JP | 6407626 | 10/2018 |
| JP | 2019-159380 | 9/2019 |
| KR | 10-2018-0086632 | 8/2018 |
| KR | WO 2019/026832 | 2/2019 |
| KR | 20200065945 | 6/2020 |
| KR | 10-2020-0115705 | 10/2020 |
| KR | 102195040 | 12/2020 |
| WO | WO 2020/174279 | 9/2020 |

OTHER PUBLICATIONS

Bae, Seung-Hwan, and Kuk-Jin Yoon. "Confidence-based data association and discriminative deep appearance learning for robust online multi-object tracking." IEEE transactions on pattern analysis and machine intelligence 40.3 (2017): 595-610. (Year: 2017).*

[No Author Listed], "SAE: Surface Vehicle Recommended Practice, Taxonomy and Definitions for Terms Related to Driving Automation Systems for On-Road Motor Vehicles," SAE International, Sep. 30, 2016, 30 pages.

* cited by examiner

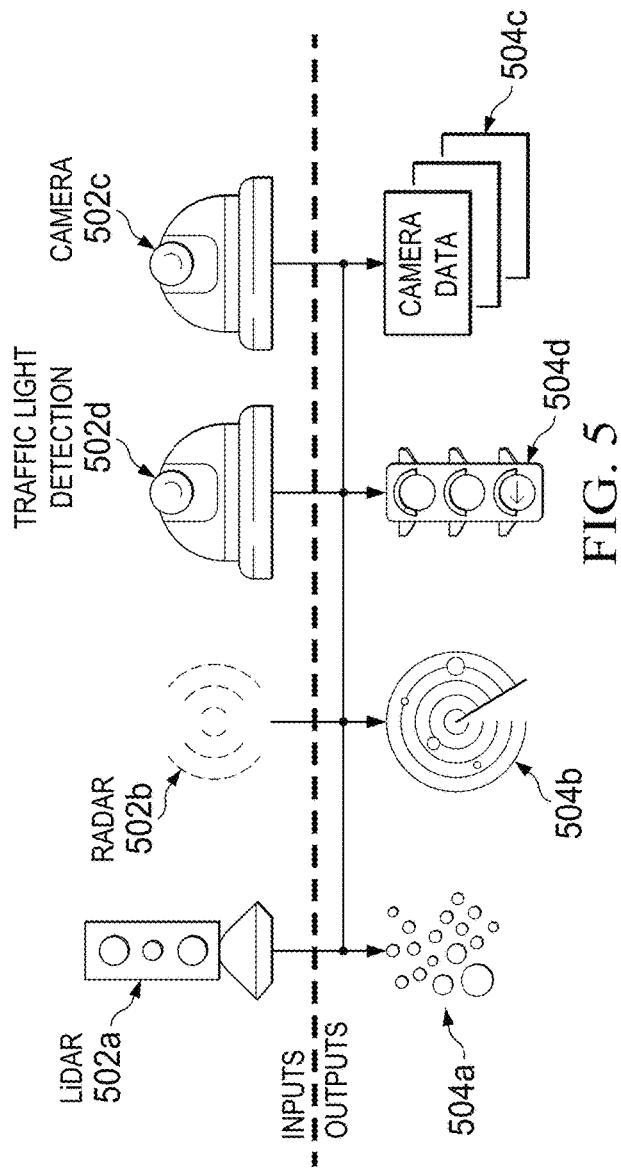
FIG. 5
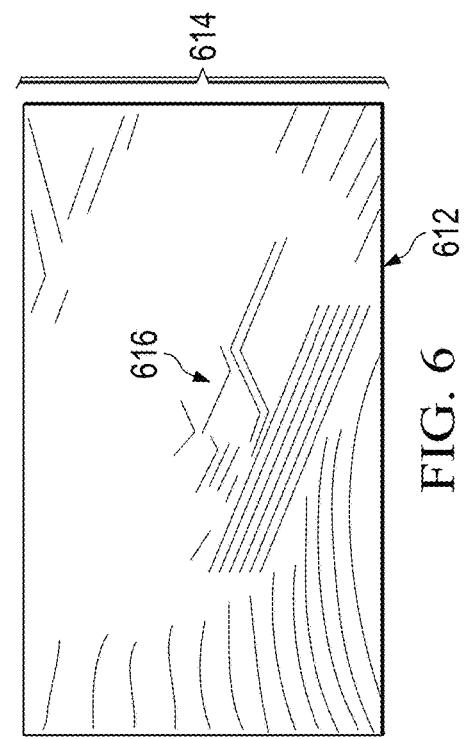
FIG. 6
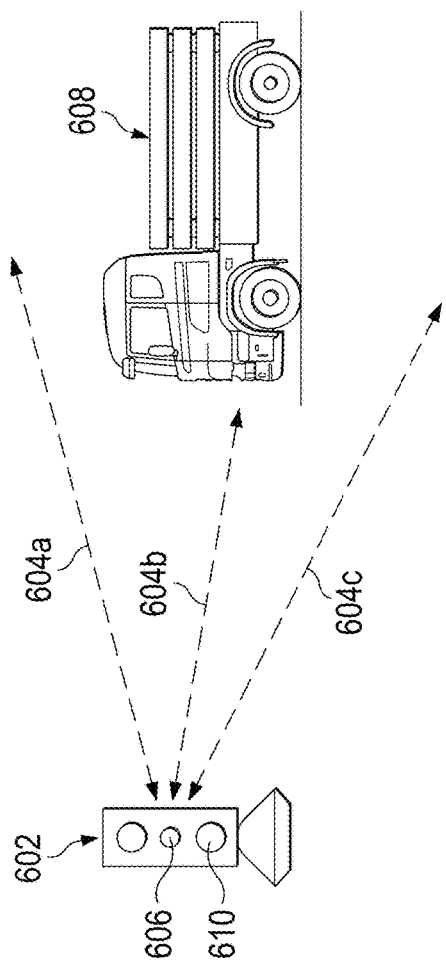

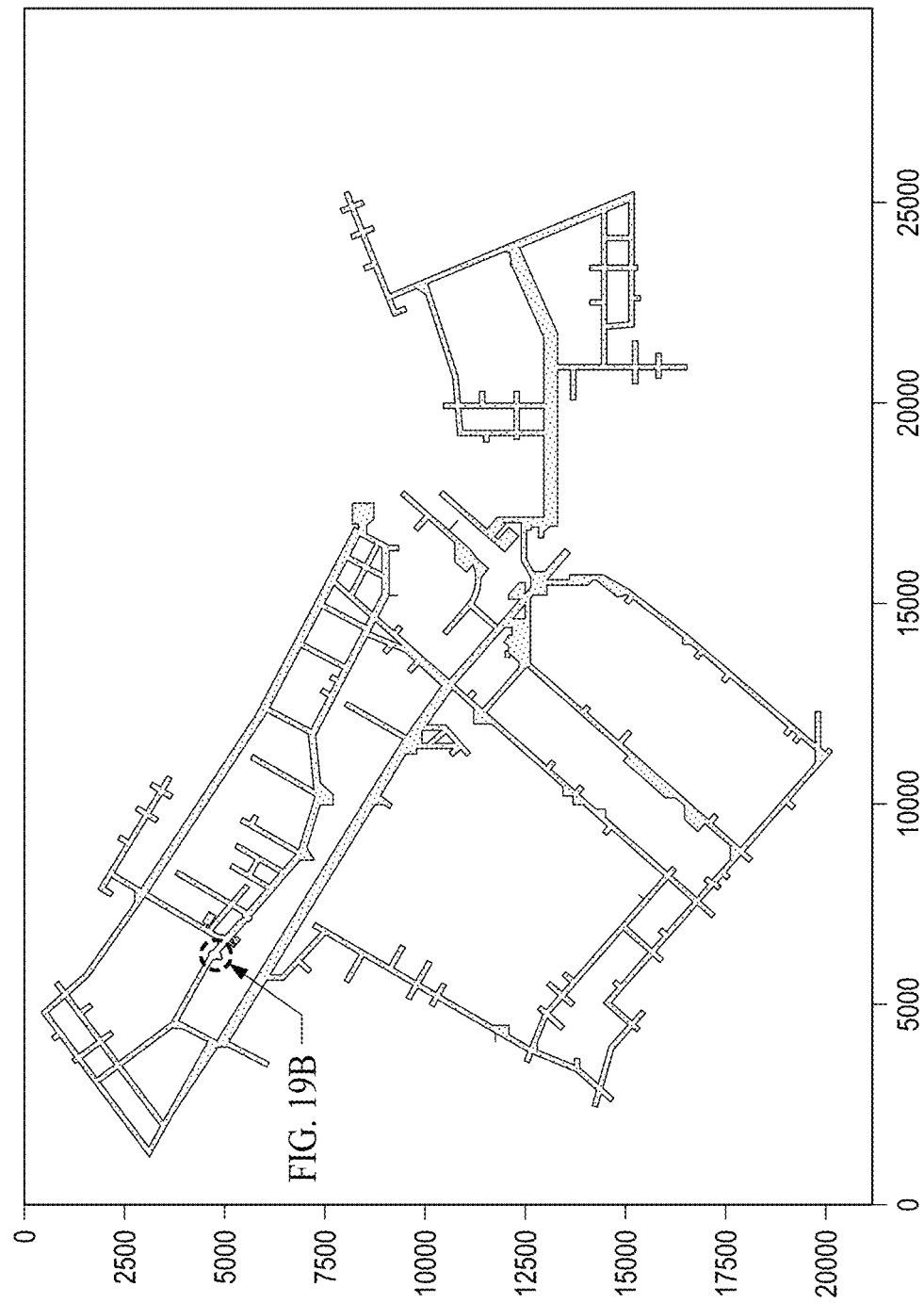

MERGING LiDAR INFORMATION AND CAMERA INFORMATION

FIELD OF THE INVENTION

This description relates to merging LiDAR information and camera information.

BACKGROUND

Segmentation and annotation may be involved in a process for identifying regions of an environment represented by information associated with the environment, the regions of the environment associated with particular features or objects. For example, when segmenting and annotating an image of an environment for later use by a vehicle, an image may be analyzed to identify certain features such as traffic lights, stop signs, vehicles, and pedestrians. The image may be annotated or labeled based on the identified features. However, human intervention may be involved in the process for identifying certain regions of the environment, particularly when the environment is complex, which may add significant time and cost to the annotation effort.

BRIEF DESCRIPTION OF THE DRAWINGS

FIG. 5 shows an example of inputs and outputs that may be used by a perception module.

FIG. 6 shows an example of a LiDAR system.

FIGS. 19A and 19B show an annotated map of traffic lights.

DETAILED DESCRIPTION

Figure 1:
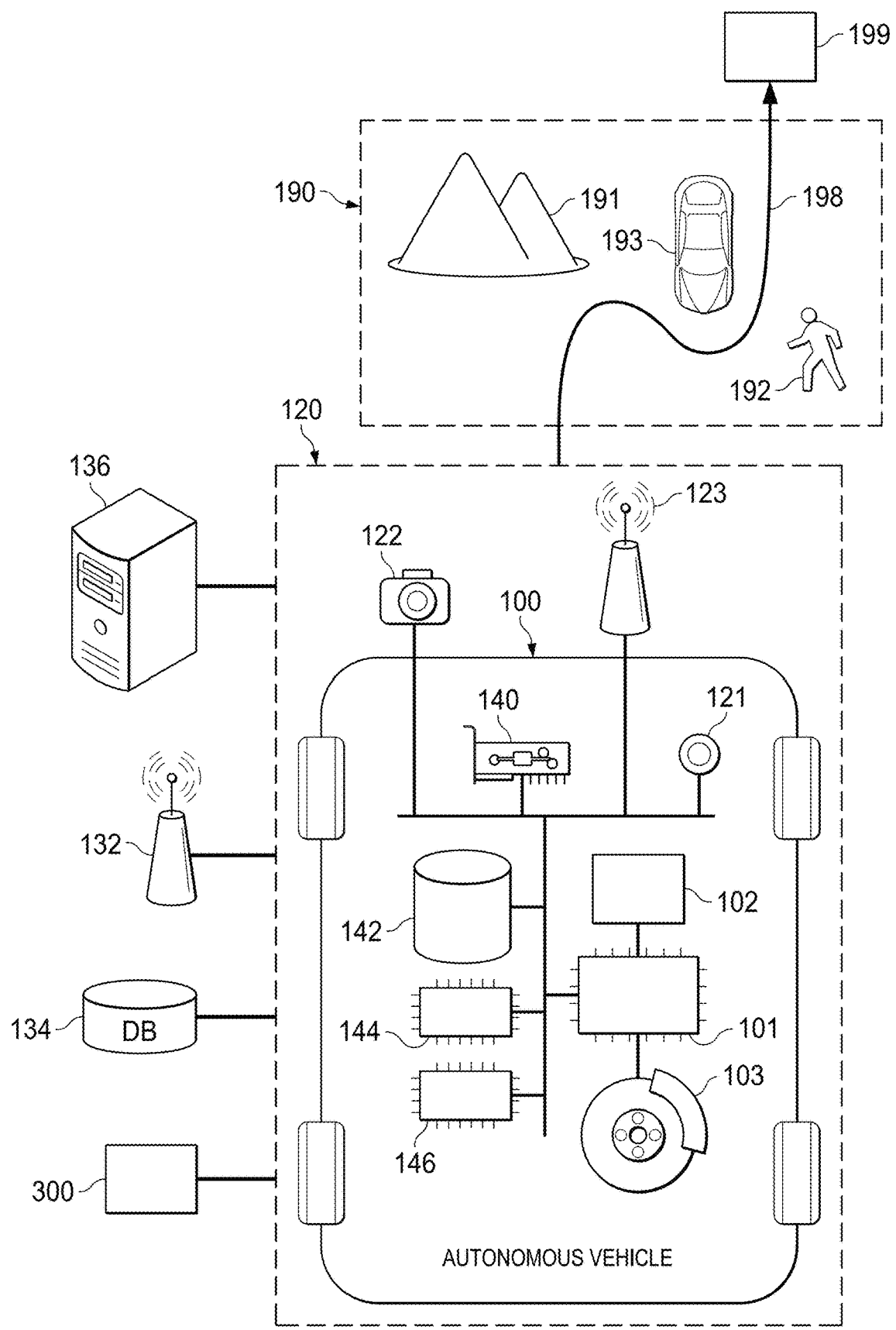
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture

4. Autonomous Vehicle Inputs
5. Autonomous Vehicle Planning
6. Autonomous Vehicle Control
7. Merging LiDAR Information and Camera Information General Overview An annotation system can be used to map LiDAR information onto camera information captured by a camera (e.g., an image from a camera on a vehicle) to determine both the distance from the camera to an object and geometric features of the object. This information can later be used (e.g., by at least one system of the vehicle) to determine the identity of objects (and in particular fixed objects) with a high confidence along with the physical location and orientation of the object.

For example, the information can later be used to determine that an object such as a traffic light is 2.5 meters away from the vehicle and oriented towards oncoming traffic. The vehicle can then track the traffic light in time as the vehicle passes underneath the traffic light, thus providing real-time information of the traffic light. Further, by storing information of the traffic light on a world map accessible to other vehicles, each vehicle can receive the location and orientation of objects as well as confirm and/or update if changes are required (e.g., if the location or the orientation of the objects have changed). For example, when the world map indicates the vehicle is approaching a traffic light, the camera can focus in on a region in front the vehicle where the traffic light is anticipated and be prepared to determine the traffic signal of the traffic light.

By autonomously detecting the location and orientation of the traffic light using a combination of LiDAR information and camera information, a reliance on human annotation decreases. Further, the combined approach results in much higher accuracy than using either LiDAR information or camera information independently. The combined approach also leverages existing cameras and LiDAR sensors on the vehicle without requiring new equipment. Further, by accounting for the travel speed of the vehicle, the system can compensate for field of view differences between the LiDAR and camera systems.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the AV system 120 includes an image merging system described below in relation to FIGS. 13A and 14A. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
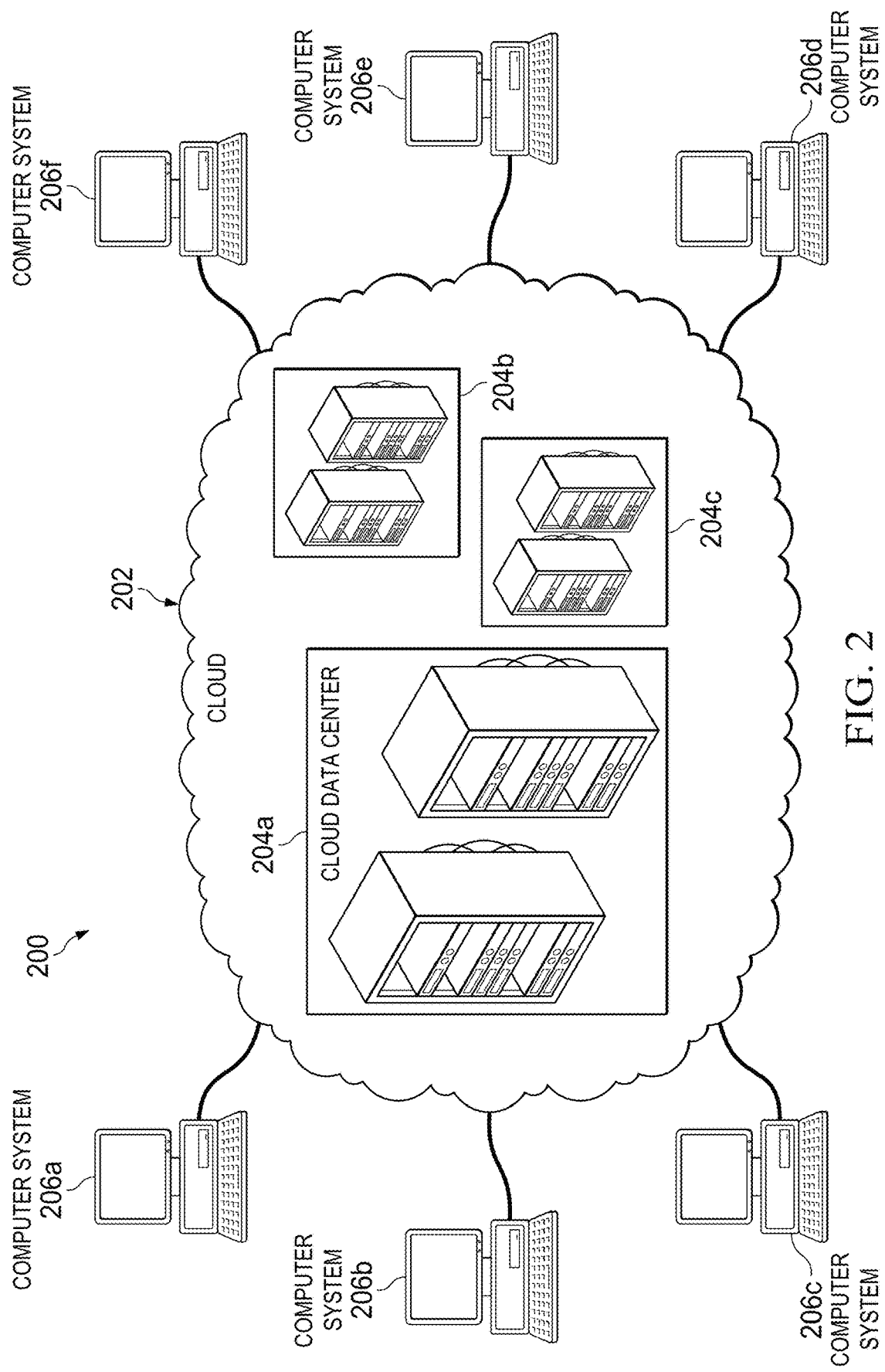
FIG. 2 shows an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
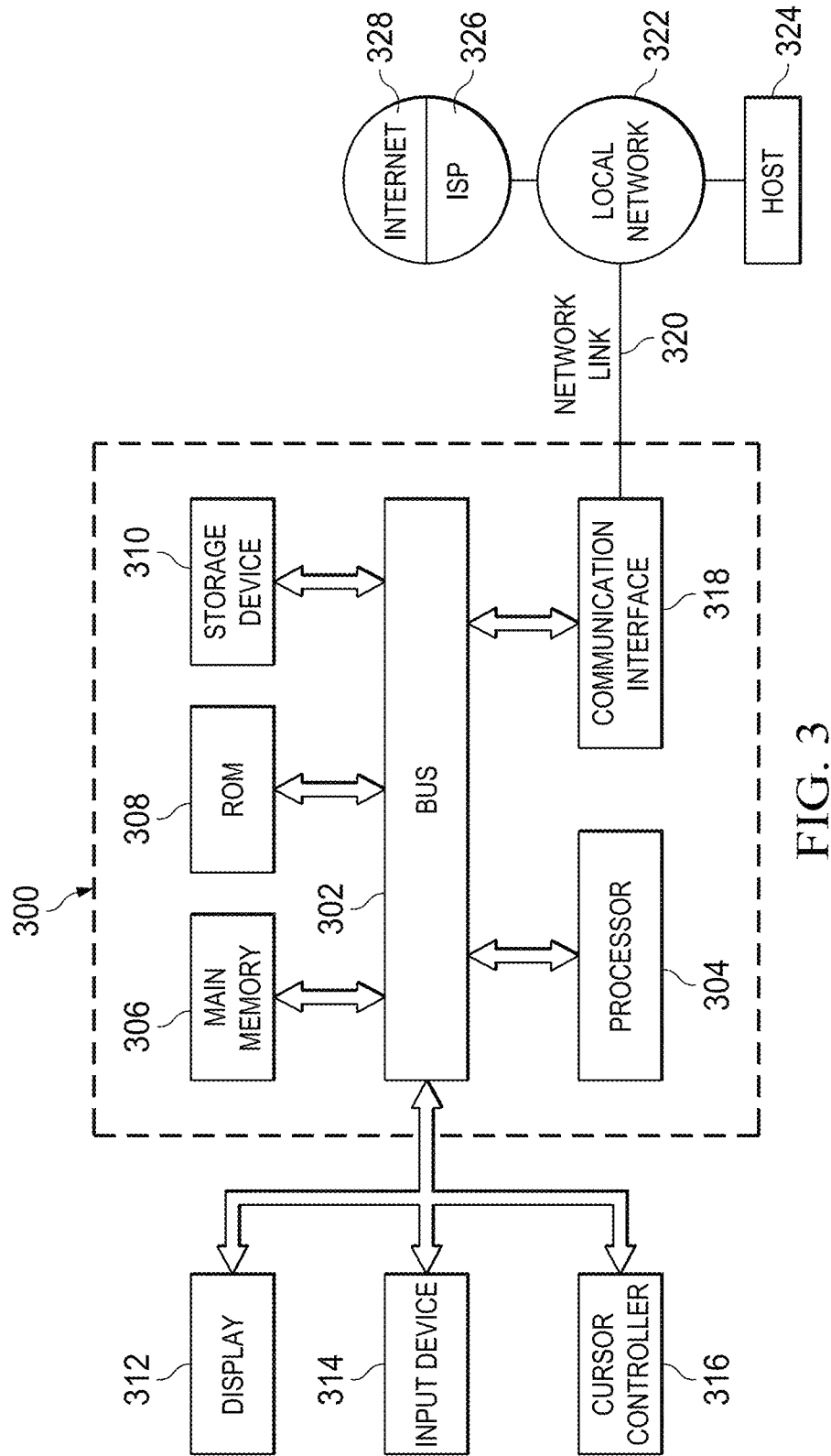
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
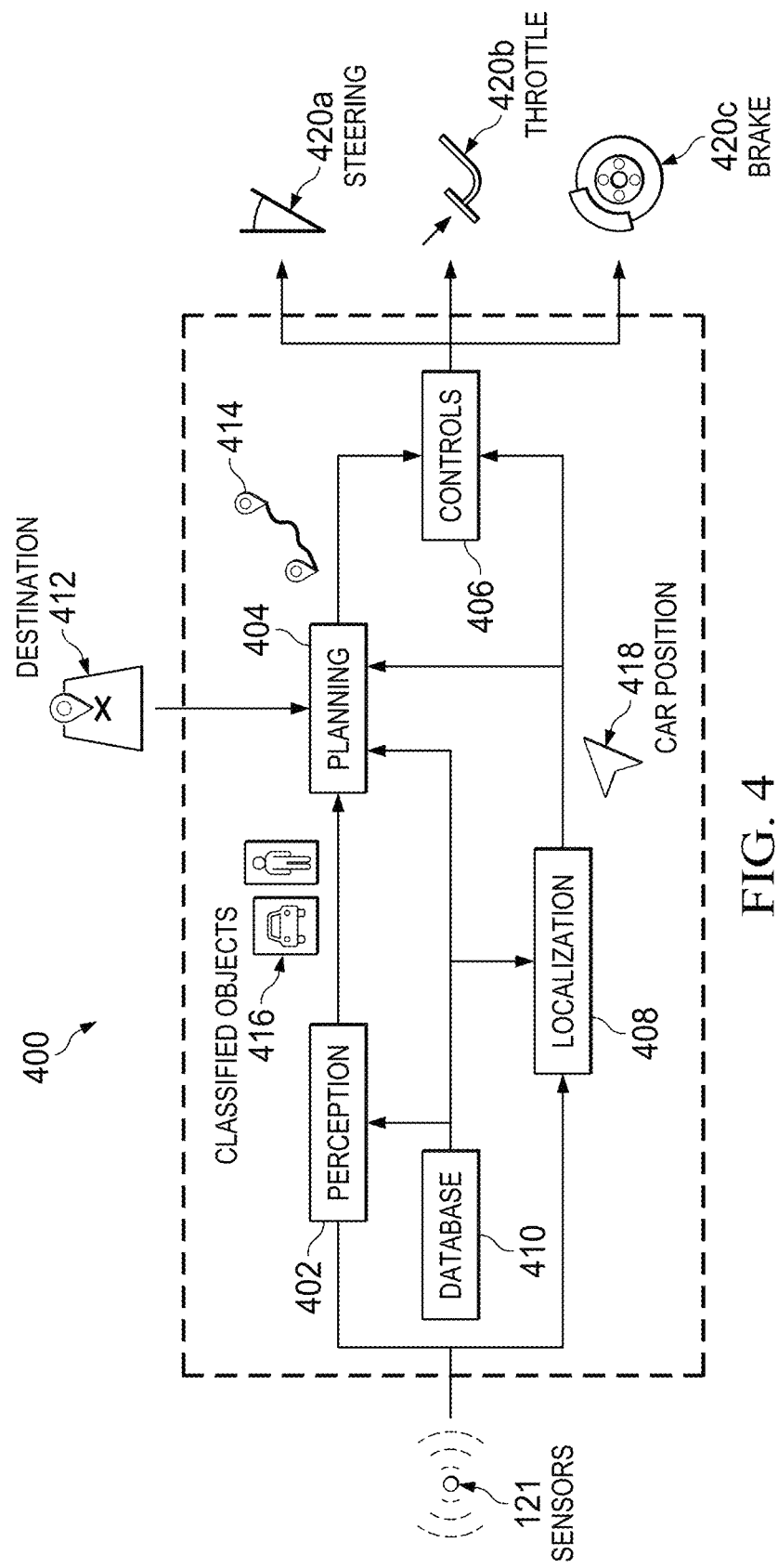
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The perception module 402 includes the previously described segmentation and annotation processes. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

FIG. 5 shows an example of inputs 502a-d (e.g., sensors 121 shown in FIG. 1) and outputs 504a-d (e.g., sensor data) that are used by the perception module 402 (FIG. 4). One input 502a includes data received from a LiDAR (Light Detection and Ranging) system (e.g., LiDAR 123 shown in FIG. 1). LiDAR is a technology that uses electromagnetic radiation (e.g., light or bursts of light such as infrared light) to obtain data about physical objects in its line of sight. A LiDAR system produces LiDAR data as output 504a. For example, LiDAR data is collections of 3D or 2D points (also known as a point clusters) that are used to construct a representation of the environment 190.

In some embodiments, the LiDAR system includes at least one laser range finder reflected by a rotating mirror. The rotating mirror is configured to rotate along an azimuth of the LiDAR system, which is typically fixed to the AV. In this way, the rotating mirror is rotated generating the collection of points along the azimuth, which is sometimes referred to as a LiDAR scan of the environment 190. In some embodiments, the rotating mirror can pitch to generate a LiDAR scan representing a 360° field of view of the environment 190 around the LiDAR system. In this way, the LiDAR scan represents a one-to-one mapping of a distance associated with a point in the environment 190 to polar coordinates of the LiDAR system (e.g., an azimuth angle and a pitch angle). In some embodiments, multiple LiDAR scans are proceeded by the perception module 402 to generate an ensemble average of the distances associated with the point clusters in the environment 190. For example, in some embodiments, five LiDAR scans are performed in succession and the distances associated with the point clusters are averaged. In some embodiments, five LiDAR scans are performed in succession and the distances associated with the point clusters are concatenated to the LiDAR data to represent the environment 190 using more point clusters (i.e., the LiDAR data representation of the environment 190 is "fuller" or "denser" with more than one LiDAR scan than with only one LiDAR scan). While five LiDAR scans is used as an example here, more or less than five scans can be performed is succession. In some embodiments, LiDAR scans are continuously performed and analyzed by the perception module 402.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
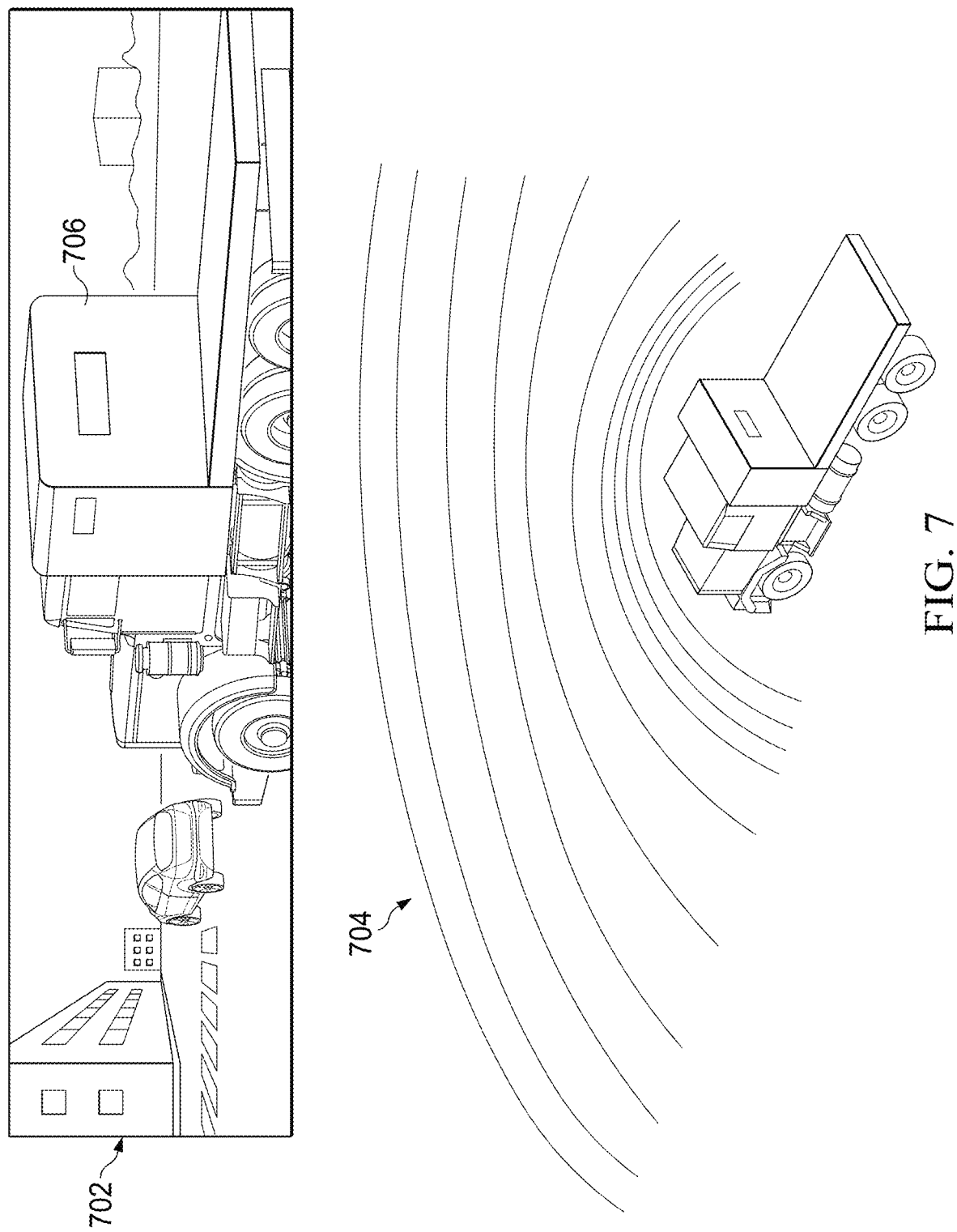
FIG. 7 shows the LiDAR system in operation.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
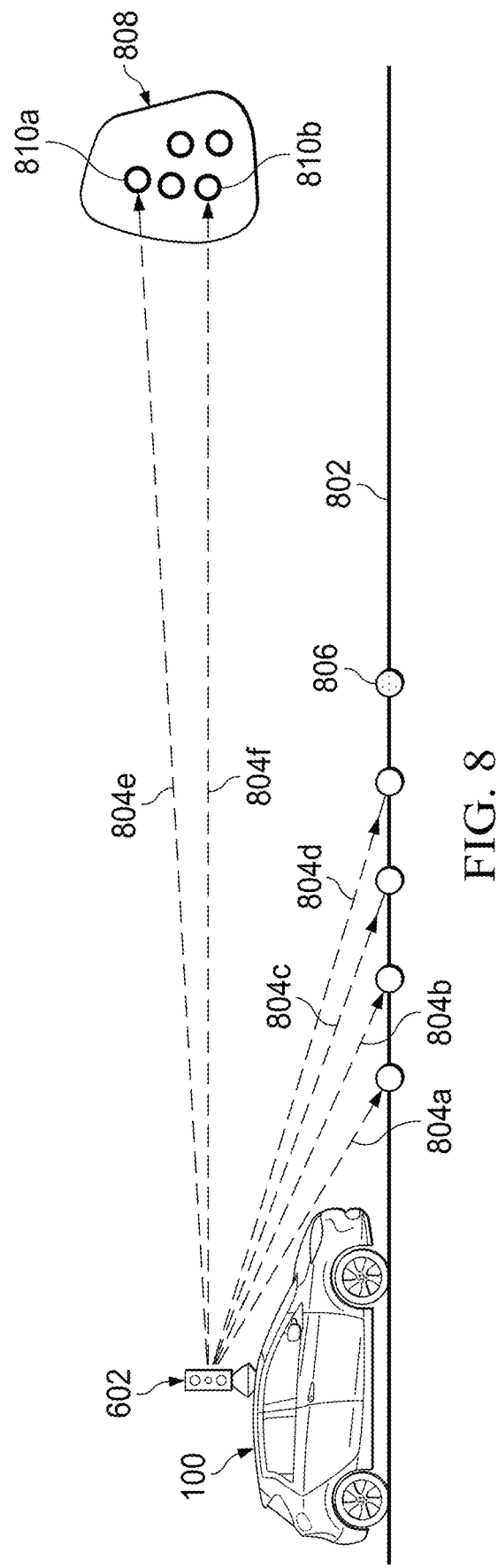
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
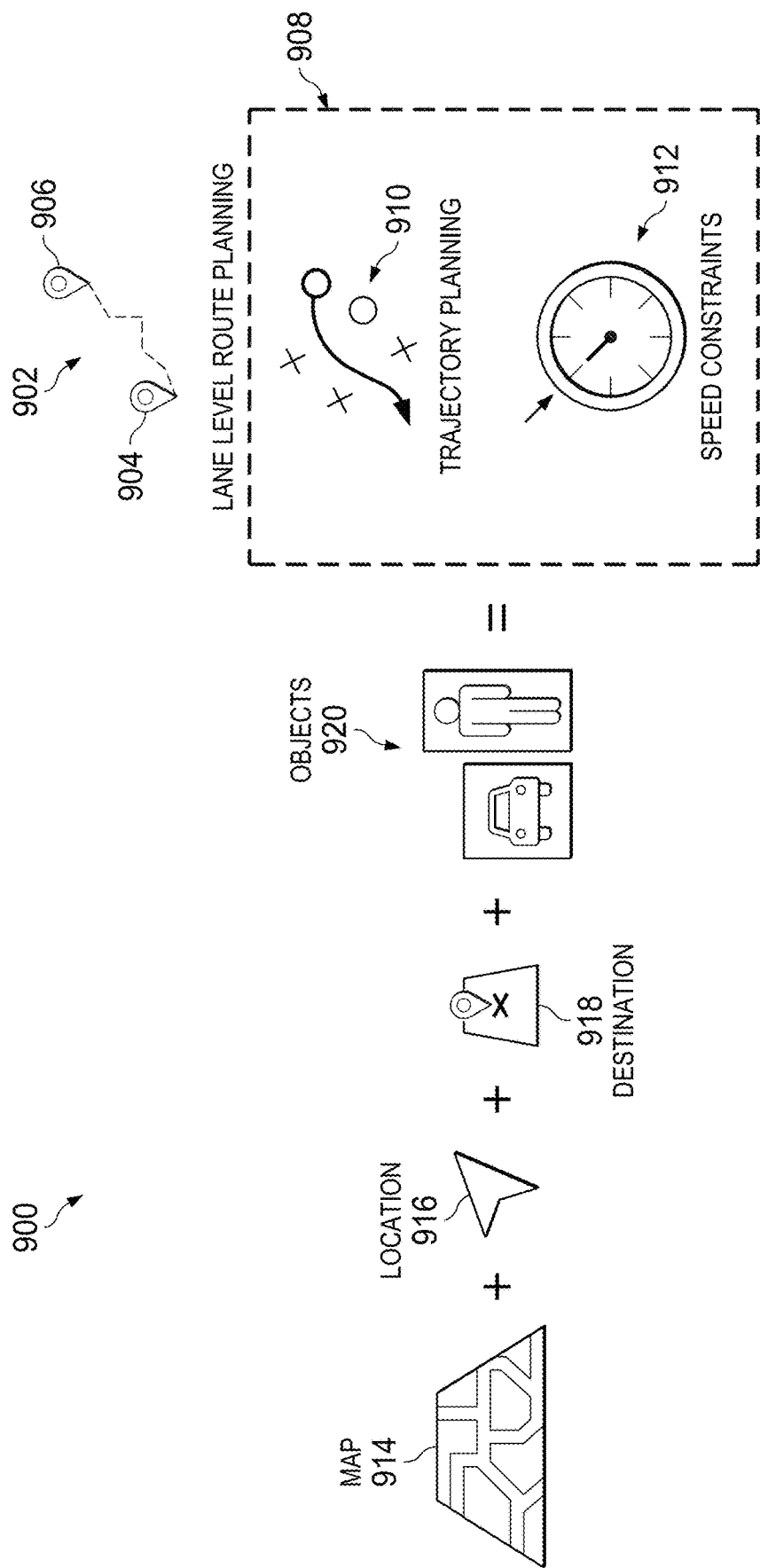
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
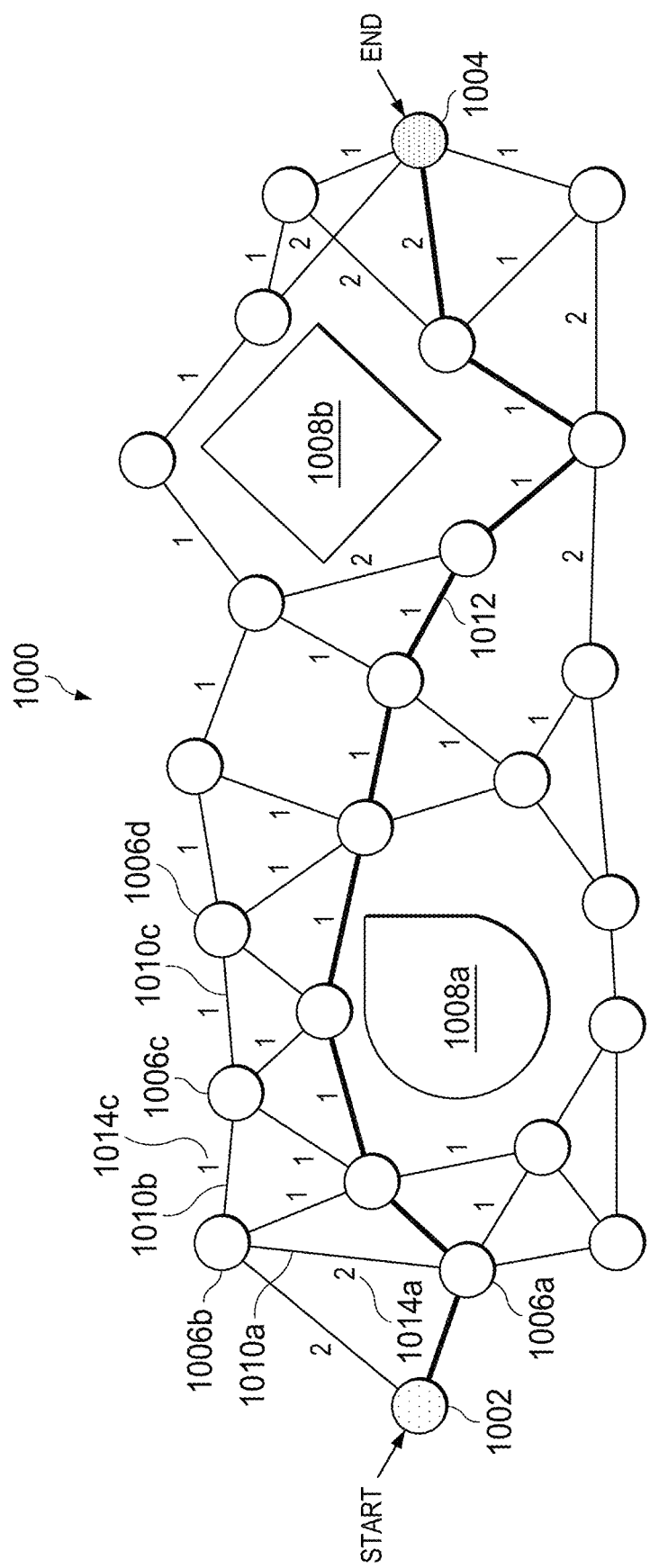
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
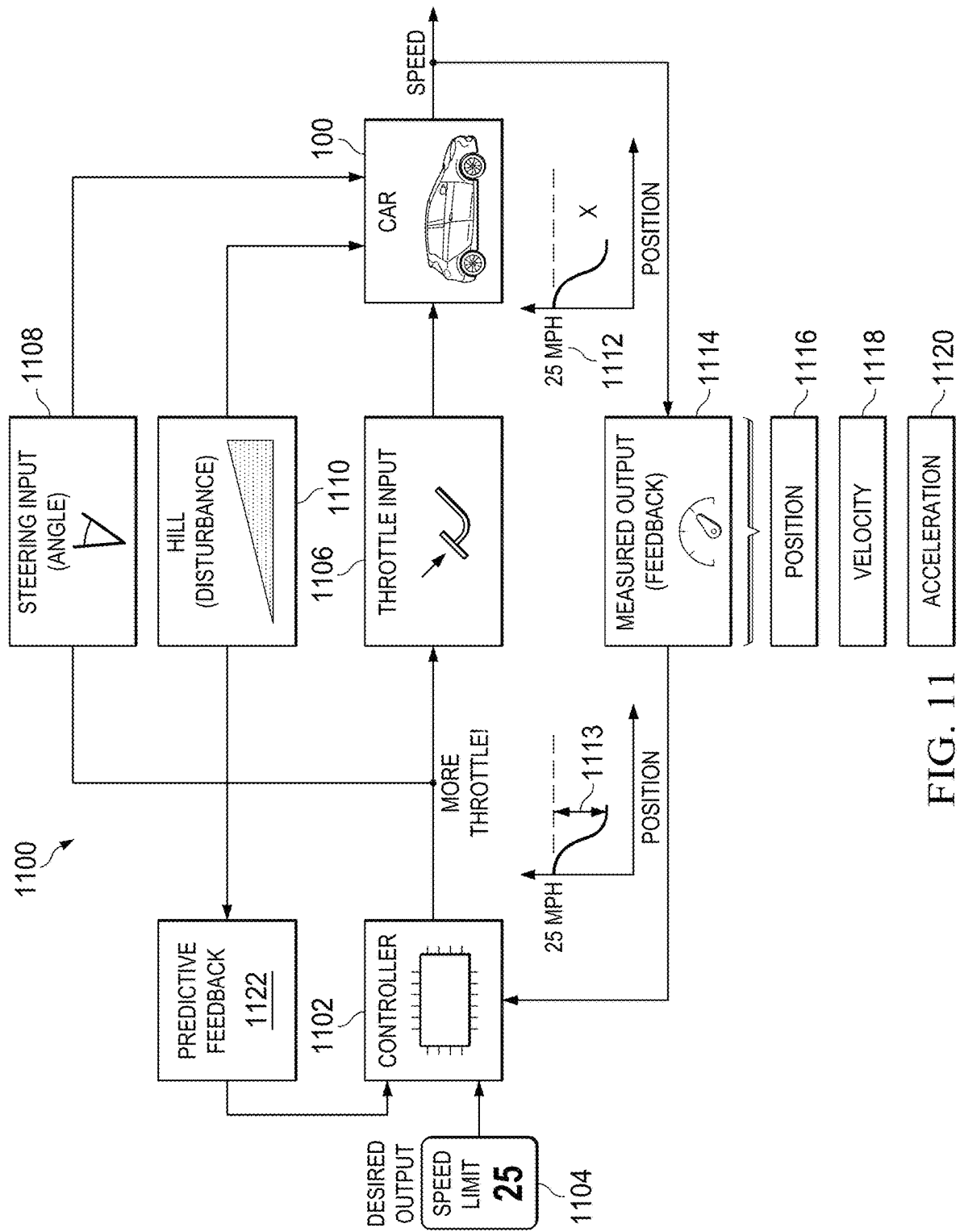
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
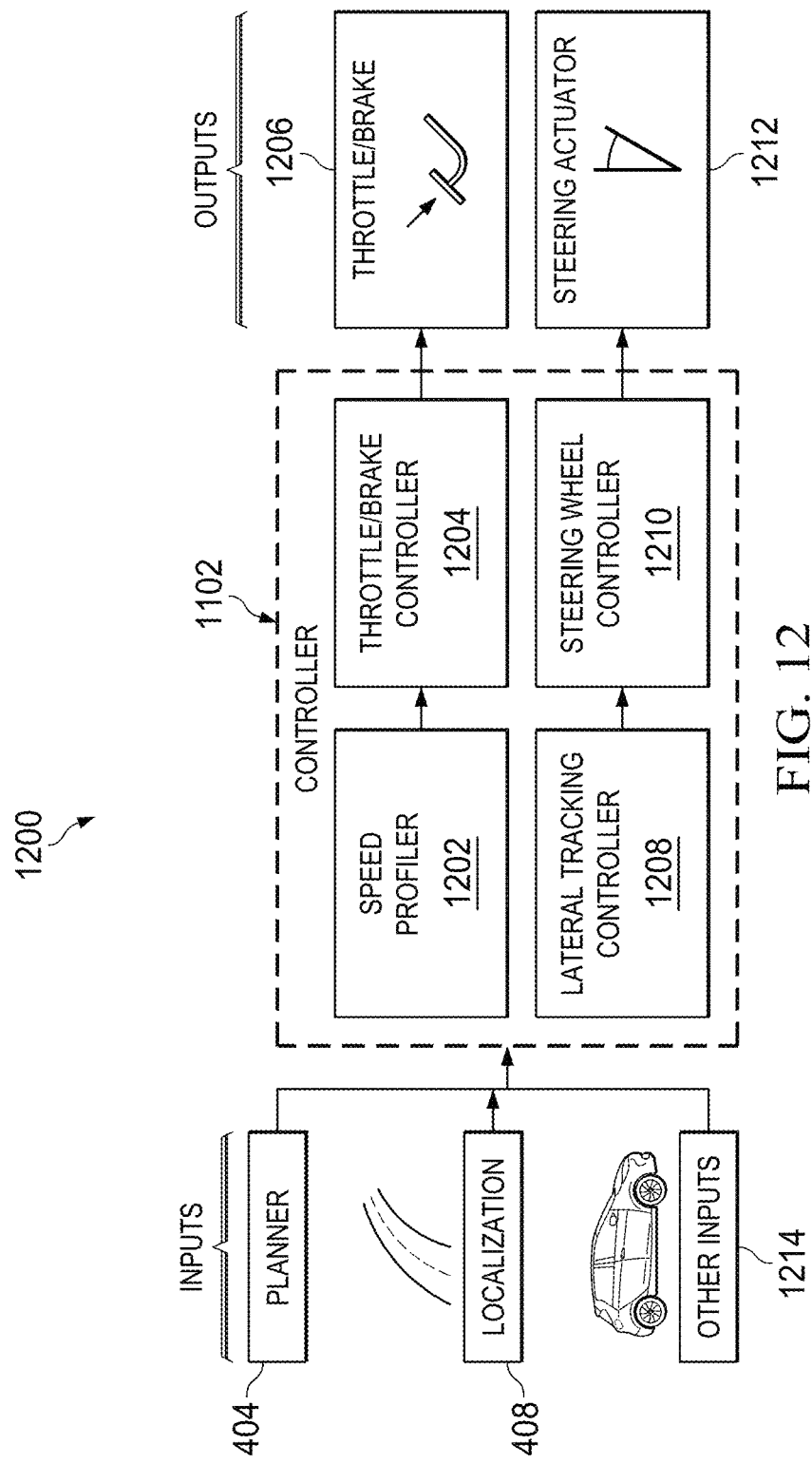
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Merging LiDAR Information and Camera Information

Figure 13B:
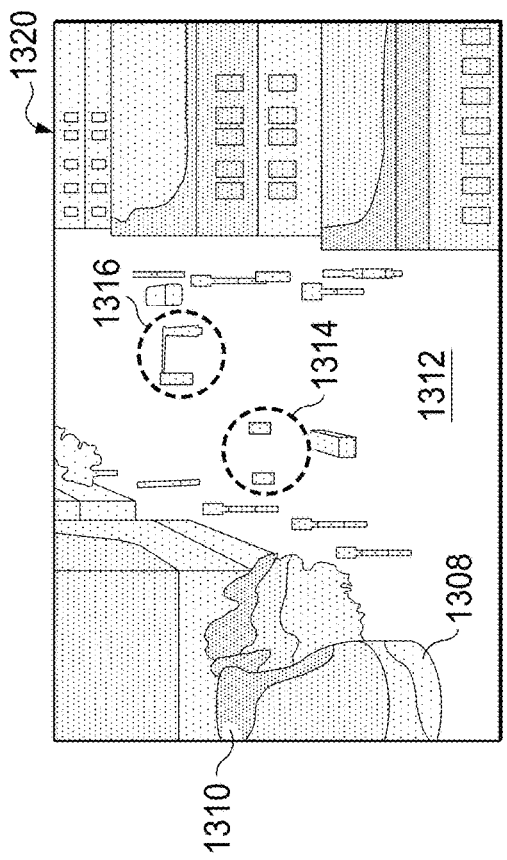
FIGS. 13A and 13B show a vehicle with a LiDAR sensor and LiDAR information generated using the LiDAR sensor.
Figure 13A:
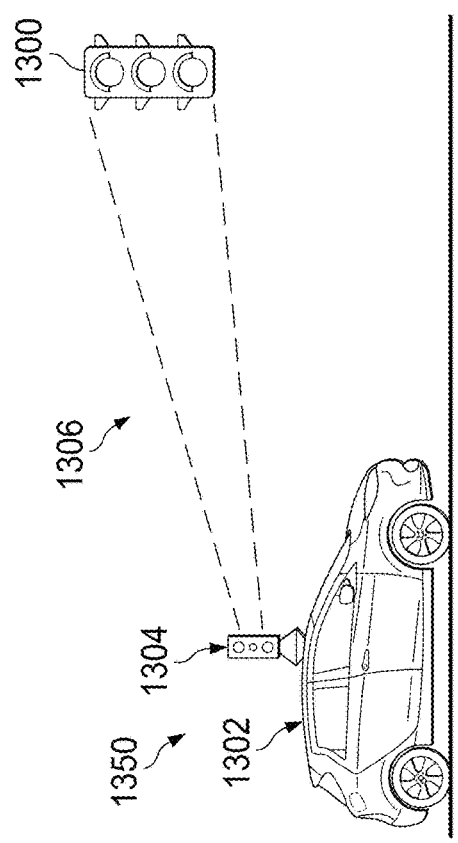

As shown in FIG. 13A, vehicle 1302 includes LiDAR system 1304. In some embodiments, the LiDAR system 1304 of vehicle 1302 is the same as, or similar to, the LiDAR system 602 of AV 100. In some embodiments, one or more of the functions described with respect to the operation of vehicle 1302 are performed (e.g., partially, completely, etc.) by at least one processor of an image merging system 1350 of the vehicle 1302. In some embodiments, the at least one processor are the same as, or similar to, computing devices 146 of AV 100. Additionally, or alternatively, one or more of the functions described with respect to the operation of vehicle 1302 are performed (e.g., completely, partially, etc.) by a processor of a remote server. In some embodiments, the remote server is the same as, or similar to, the cloud server 136. In some embodiments, the remote server is the same as, or similar to, the cloud computing environment 200.

The at least one LiDAR system 1304 emits electromagnetic radiation in the form of light within a field of view 1306 of the LiDAR system 1304. The light is then reflected off an object 1300 (e.g., a traffic light), and received by the LiDAR system 1304. In this way, the LiDAR system 1304 detects electromagnetic radiation reflected from objects 1300 proximate (e.g., 1 meter, 2 meters, or another distance) to the vehicle 1302 and generates LiDAR information based on the detected electromagnetic radiation. The LiDAR system 1304 is in communication with the image merging system 1350 of the vehicle 1302 and LiDAR information is transmitted to the image merging system 1350 for processing (e.g., a signal is received by the at least one processor of the image merging system 1350 from the LiDAR system 1304 representing the LiDAR information). In this way, the image merging system 1350 analyzes the received LiDAR information to detect objects 1300 proximate to the vehicle 1302. In some cases, the LiDAR system 1304 generates LiDAR information associated with a point cloud based on LiDAR system 1304 receiving reflected light. In some cases, the LiDAR system 1304 transmits the LiDAR information associated with the point cloud to image merging system 1350 of the vehicle 1302. The image merging system 1350 generates a LiDAR image (e.g., as shown in FIG. 13B) based on the received LiDAR information.

FIG. 13B is an example of a LiDAR image 1320 which represents (i) the heading (e.g., pitch and yaw of the LiDAR system 1304) of each LiDAR point of the LiDAR information relative to the vehicle 1302 in an 2D dimensional coordinate frame and (ii) the distance of each LiDAR point from the vehicle 1302 as a relative intensity of each LiDAR point. The relative intensity is represented using a shading scale. For example, an object closest to the LiDAR system 1304 (and the vehicle 1302) is shown using a first shade 1308, an object furthest is shown using a second shade 1310, and objects between these two distances are shown using an interpolated shade. Portions of the LiDAR image 1312 with no shading 1312 did not receive any substantial reflections of light.

In some embodiments, LiDAR system 1304 determines that a reflection of a LiDAR point is substantial when a signal ratio of received light relative to transmitted light is greater than or equal to a threshold value. Additionally, or alternatively, in some embodiments, LiDAR system 1304 determines that a reflection of a LiDAR point is not substantial when the signal ratio is less than or equal to the threshold value. In some examples, when the LiDAR system 1304 transmits light with unit power, and receives light less than one-one millionth of the unit power of the transmitted light, the received reflection is considered insubstantial (e.g., less than −60 dB using the formula $10 \log_{10}$ (received signal/transmitted signal)). The portions of the LiDAR image 1320 associated with no LIDAR information 1312 are below the threshold value.

In some embodiments, the threshold value is varied to accommodate for a changing noise floor or the LiDAR system 1304 (e.g., electronic noise, analog to digital conversion, RF interference, etc.). The signal to noise ratio (SNR) is based on the noise floor. In some examples, electronic noise is so large (e.g., from a grounding problem) that the LiDAR system 1304 cannot distinguish received signals (and hence received LiDAR information) from the electronic noise. As a result, in this case, the threshold is increased above the electronic noise based on the electronic noise.

In some embodiments, the threshold value is varied to accommodate a changing environment of the LiDAR system 1304 (e.g., as the vehicle 1302 moves through the environment.) In some examples, the environment 1302 includes structures that do not reflect light well (e.g., non-reflective structures, no structures at all, etc.) and, as a result, substantial signals are not received by the LiDAR system 1304. In this case, the threshold is increased so that the structures are better resolved by the LiDAR system 1304.

FIG. 13B shows two regions 1314, 1316 that represent traffic lights mounted to horizontal poles at an intersection. The traffic lights are resolved using a plurality of LiDAR points of the LiDAR information. In this scenario, a collection of one or more LiDAR points are represented as a LiDAR point cluster. In some embodiments, a LiDAR point cluster is determined by the image merging system 1350 based on a heading (e.g., pitch and yaw) relative to the vehicle 1302 of each respective LiDAR point and distance from the vehicle 1302 to each respective LiDAR point. In some examples, the image merging system 1350 determines that four LiDAR point clusters of objects (e.g., the two traffic lights in region 1314 and the two traffic lights in region 1316) are present in the LiDAR information.

The image merging system 1350 of the vehicle 1302 determines the heading and distance from the vehicle 1302 to each of the LiDAR point clusters of the LiDAR information. In some examples, an orientation is determined based on the heading and distance information. In some examples, the orientation represents a direction the object is facing. For example, traffic signals (e.g., red, yellow, green lights, etc.) of a traffic light are directed in the direction the traffic light is facing (e.g., towards oncoming vehicles). As another example, a stop sign includes a surface with a signal or message that is intended to be viewed in a direction normal to the surface (e.g., towards oncoming vehicles). In this scenario, the orientation represents a direction normal to the plane of the surface with the signal or message. In some examples, an average value of heading, distance, and orientation of each respective LiDAR point is used by the image merging system 1350 to determine the heading, distance, and orientation of the LiDAR point cluster. In some examples, this average value of heading and orientation includes a distance from the LiDAR system 1304 to one or more portions of a surface of an object.

In this way, the location (e.g., heading and distance) of LiDAR points indicate that one or more of a plurality of objects (e.g., a person, a trashcan, a sign, etc.) are present at a certain location within the environment of the vehicle 1302. For example, in the case of a traffic light 1300 as shown in FIG. 13A, the image merging system 1350 of the vehicle 1302 processes the received LiDAR information to determine a plurality of distances between the vehicle 1302 and one or respective surfaces of the traffic lights.

Figure 14B:
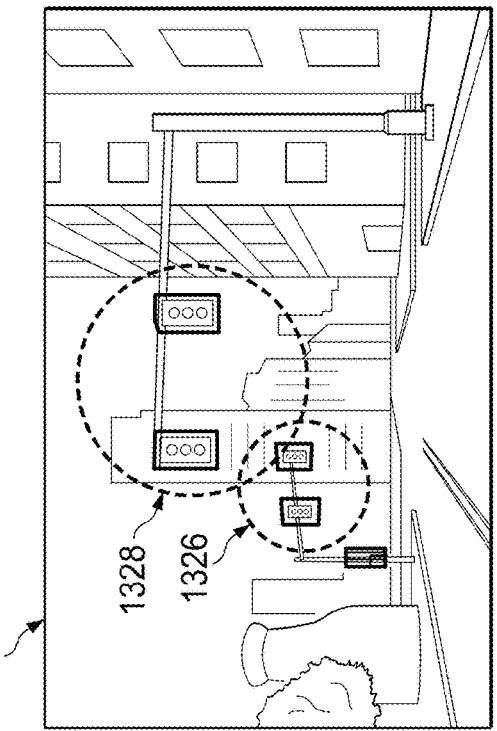
FIGS. 14A and 14B show the vehicle with a camera and the camera information generated using the camera.
Figure 14A:
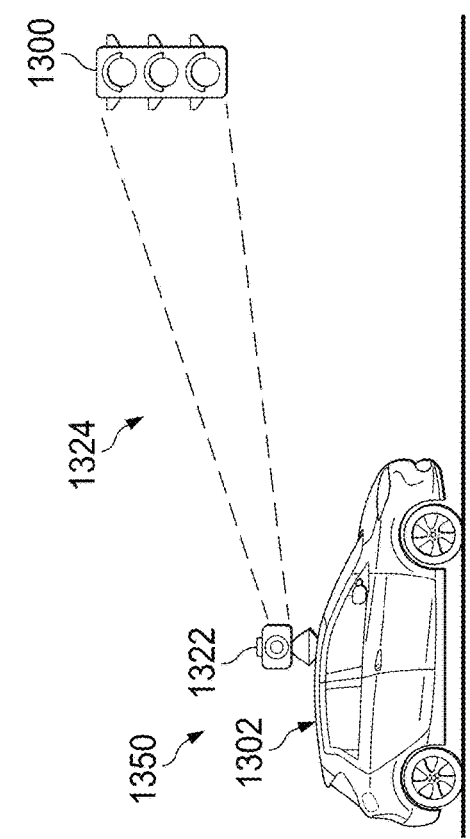

FIG. 14A shows at least one camera system 1322 mounted on the vehicle 1302. In some embodiments, the camera system 1322 is the same as, or similar to, the camera system 122 of AV 100. The camera system 1322 is in communication with the image merging system 1350 the vehicle 1302 and transmits information as camera information to the at least one processor for processing (e.g., a signal is received by the at least one processor of the image merging system 1350 from the camera system 1322 representing the camera information). In this way, the image merging system 1350 analyzes the received camera information to detect objects 1300 proximate to the vehicle 1302 within the field of view 1324 (e.g., in the example shown, the camera system 1322 captures an image of the same object 1300 shown in FIG.

13A.) The image merging system 1350 generates a camera image (e.g., as shown in FIG. 14B) based on the received camera information.

FIG. 14B shows a typical output image 1330 of the camera system 1322 after a segmentation process has identified one or more traffic lights in the image. The traffic lights are associated with (e.g., represented by) the regions 1326, 1328 in the image 1330. For example, the image merging system 1350 of vehicle 1302 analyzes the image 1330 (e.g., using edge detection, color changes, contest gradients, etc.) to determine geometric features (e.g., surfaces, edges, vertices, etc.) and subsequently determine which objects 1300 are traffic lights based on knowledge of these geometric features (e.g., via an annotation process of the perception module).

An important aspect of this specification relates to merging, by the image merging system 1350, the LiDAR information from the LiDAR system 1304 and the camera information from the camera system 1322. This enables the image merging system 1350 to determine the orientation, heading, and/or position of objects of particular interest to the vehicle 1302 with increased accuracy compared to determining these same parameters using either the LiDAR information or the camera information alone. In this way, the image merging system 1350 associates geometric features represented in the image information (e.g., FIG. 14B) with the LiDAR points and/or LiDAR point clusters from the LiDAR information (e.g., FIG. 13B).

In an embodiment, the image merging system 1350 of the vehicle 1302 identifies the detected object 1300 based on the LiDAR information and camera information. In some examples, the identification associates the detected object 1300 with a traffic light.

In an embodiment, the LiDAR information, the camera information, and/or the merged image is used by the image merging system 1350 of the vehicle 1302 to determine classification information of the object. The classification information is representative of a level of interest of the object within the LiDAR information and camera information as previously described. In some examples, the annotation and segmentation process determines the classification information and transmits the classification information to the image merging system 1350 for processing.

In some examples, the classification is indicative of the object moving in the environment (e.g., vehicles, swaying trees, pedestrians, etc.) or stationary in the environment (e.g., traffic lights, traffic signs [stop signs, yield signs, speed limit signs], cross walks, etc.). In an embodiment, moving objects are detected by the image merging system 1350 of the vehicle 1302 based on acquired camera information and acquired LiDAR information over a time period (e.g., camera information and LiDAR information is acquired multiple times to determine a change in position of the object over time. In this scenario, in some examples, the image merging system 1350 determines that an object moved 0.1 m towards the vehicle 1302 in 2 seconds. In some examples, moving objects are detected based on tracking an identification of the annotation and classification process (e.g., the annotation process determines that an object is a vehicle using the features of the object such as license plates, edges of the object, head lights, etc.).

In an embodiment, the classification process groups the object into one or more categories (e.g., category 1 are traffic lights, category 2 are traffic signs, and category 3 are everything else). For example, if the vehicle 1302 becomes aware of several objects ahead in category 1, it triggers a process to determine the color and position of the light emitted from the traffic light to determine whether the traffic light is signaling the vehicle 1302 to go, yield, or stop. In an embodiment, directional indicators of the traffic light (e.g., a green left arrow) are detectable by analyzing the features of the light emitted by the traffic light. In the scenario where the detected object is a traffic light, in some examples, the image merging system 1350 determines that a change to the vehicles trajectory is not needed (e.g., no need to slow down yet) if the traffic light is yellow and is 500 m away from the vehicle 1302. On the other hand, in some examples, the image merging system 1350 instructs the vehicle to perform an update to the trajectory in order to enable the vehicle 1302 to immediately stop if a traffic light is red and is 20 m away from the vehicle 1302.

In some examples, the image merging system 1350 of the vehicle determines an available response time based on a distance from the vehicle 1302 to the object (e.g., as determined by the image merging system 1350 using the LiDAR information) and a current velocity of the vehicle 1302. In this way, the available response time represents how much time is available to react to the detected object. In some examples, the trajectory of the vehicle 1302 is updated based on the available response time (e.g., if there is not enough time to stop in the left turning lane, then switch lanes and proceed straight through the intersection).

In an embodiment, if the vehicle 1302 becomes aware of several objects ahead in category 2, the image merging system 1350 of the vehicle 1302 determines (or causes a determination of) what the traffic sign says or means. In this scenario, the image merging system 1350 interprets the words and/or the expressions from the sign. In some examples, the traffic sign is a pedestrian cross walk sign and is detected by extracting features of the sign (e.g., the shape of the sign) and performing image processing via the annotation process (e.g., the received camera information, LiDAR information, and/or merged information is compared with known images of cross-walk indicators).

In an embodiment, the image merging system 1350 of the vehicle 1302 establishes an alert level based on the classification of objects. In some examples, the alert level is based on received annotation information. In some examples, the image merging system 1350 of the vehicle 1302 places the vehicle 1302 on high alert (e.g., higher than normal) for pedestrians in the area. In some examples, the image merging system 1350 controls the vehicle 1302 to slow down in response to being on high alert. In some examples, the image merging system 1350 transmits these control signals to a separate vehicle control for controlling the vehicle 1302.

In an embodiment, the image merging system 1350 of the vehicle 1302 establishes a yield level representing whether or not the vehicle 1302 has the right of way. In some examples, if the image merging system 1350 determines that an upcoming traffic sign is a yield sign, the image merging system 1350 establishes the yield level and controls the vehicle 1302 to yield to other vehicle. In some examples, the image merging system 1350 transmits the control signal to a separate vehicle control for controlling the vehicle 1302.

In some examples, traffic signs have instructions associated to them (e.g., school zone sign causes the vehicle 1302 to slow down, stop sign causes the vehicle 1302 to stop, etc.) and the instructions are received by the image merging system 1350 of the vehicle 1302, interpreted, and used for controlling operations of the vehicle 1302. In some examples, the instructions of traffic signs are performed by the image merging system 1350 via a look-up table or database. In some examples, the instructions are retrieved by the image merging system 1350 from a map.

In an embodiment, a temporary distinction is included in the classification information. The temporary distinction is indicative of a temporary object. In some examples, the image merging system 1350 uses the temporary distinction to control the vehicle cautiously. For example, in the case of a construction zone, the vehicle slows down. In some examples, the temporary distinction is based on the object classification (e.g., only apply a temporary distinction if the object is classified using category 1 and/or category 2).

In some examples, the image merging system 1350 of the vehicle 1302 determines that a traffic sign in category 2 is temporary based on movement of the traffic sign (e.g., such as when worker waves the sign or flips the sign, the sign is attached to a moving construction vehicle, etc.). In some examples, the image merging system 1350 infers that the traffic sign should not move (e.g., by determining that the traffic sign is rigidly connected to the ground based on a presence of a rigid connection (a pole) between the traffic sign and the ground) and a determination of movement results in a temporary distinction. In some examples, the image merging system 1350 infers that the traffic sign should not move based on receiving an indication that the traffic sign is a permanent structure from the server, database, map, or from the traffic sign itself (e.g., via a broadcasting wireless signal from the traffic sign).

In some embodiments, the image merging system 1350 of the vehicle 1302 accounts for a timing difference between the acquisition of the camera information by the camera system 1322 and the LiDAR information by the LiDAR system 1322. In some examples, the image merging system 1350 determines the merging process of the LiDAR information and the camera information based on the timing difference. Aspects related to the timing difference are further explained with respect to FIGS. 15A-15D below.

FIGS. 15A-15D show a timing sequence of steps that occur between acquiring the LiDAR information from the LiDAR system 1304 and acquiring the camera information from the camera 1322.

Figure 15A:
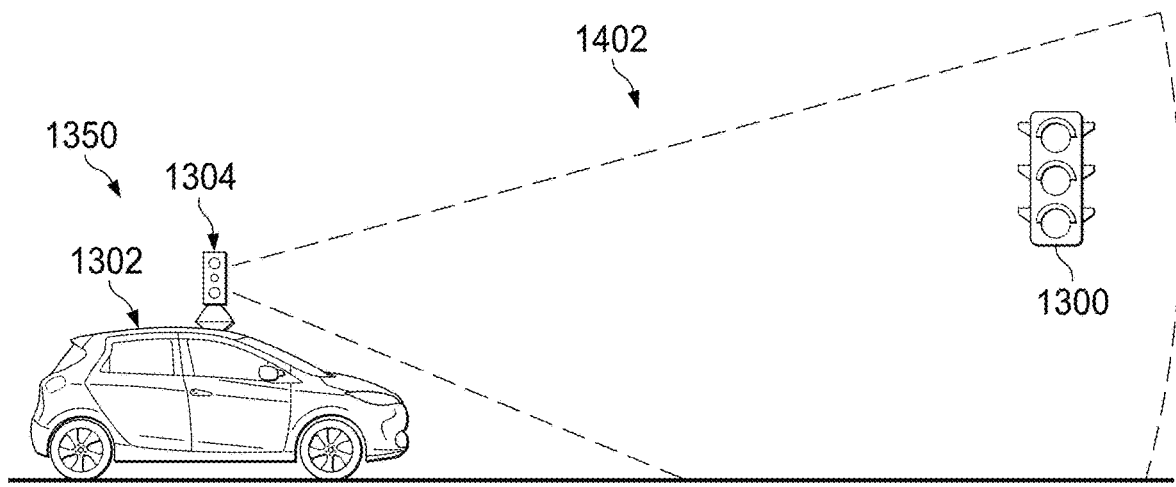
FIGS. 15A-15D show a timing sequence between acquiring LiDAR information and acquiring camera information from the camera.

FIG. 15A shows the traffic light 1300 within a field of view 1402 of the LiDAR system 1304 of the vehicle 1302. In some examples, the field of view 1402 represents an outline of which objects are detectable by the LiDAR system 1304. In an embodiment, the LiDAR system 1304 is pitched downward to emphasize objects on the ground of the environment over objects in the air (e.g., above the ground). The LiDAR system 1304 acquires LiDAR information of the traffic light 1300 and the LiDAR information is transmitted to the image merging system 1350 of the vehicle 1302.

Figure 15B:
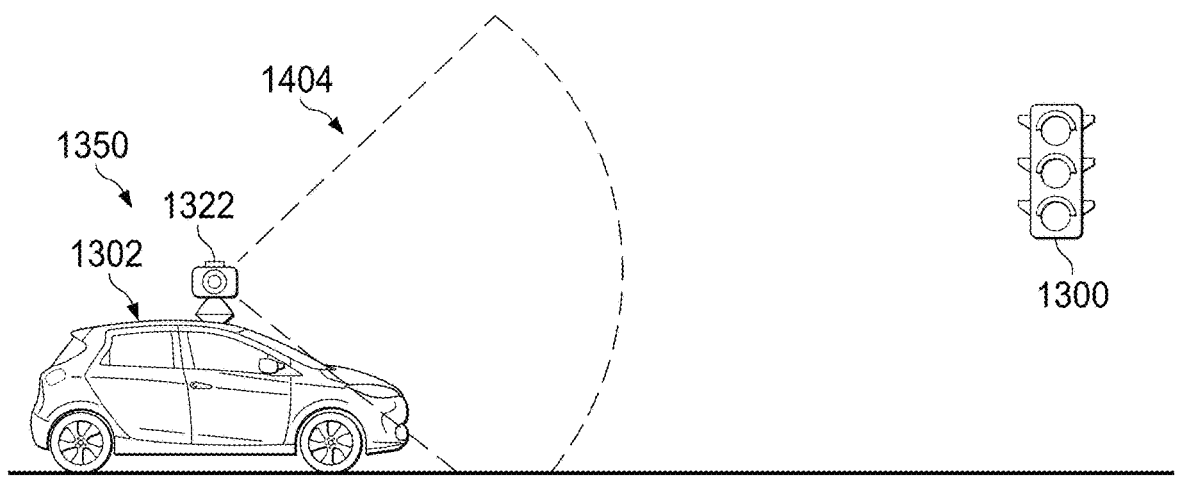

FIG. 15B shows a field of view 1404 of the camera system 1322 of the vehicle 1302. The field of view 1402 is typically different from the field of view 1404 because the LiDAR system 1304 and camera system 1322 typically have different optical configurations. At a particular point in time, the processor of the vehicle 1302 instructs the LiDAR system 1304 and the camera system 1322 to acquire information about the environment of the vehicle 1302. As shown in FIGS. 15A and 15B, if the LiDAR system 1304 and the camera system 1322 acquire information at the same time, a scenario could exist where the field of view 1402 of the LiDAR system 1304 includes the traffic light 1300, but the field of view 1404 of the camera system 1322 does not include the traffic light 1300. In this context, field of view 1404 denotes regions where the detectable objects are within focus and resolvable with a threshold number of pixels (e.g., at least 100 pixels).

Figure 15C:
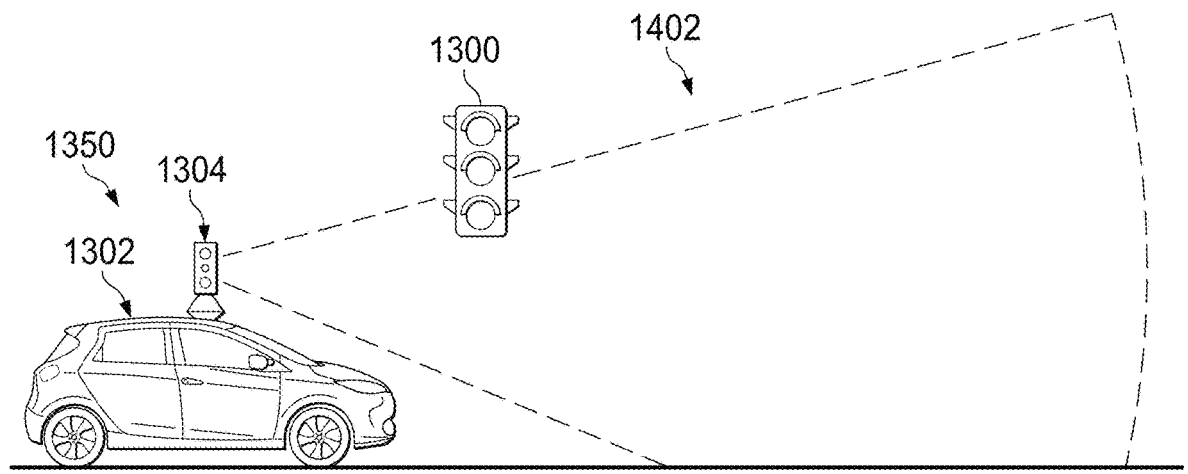

FIG. 15C shows a situation where the vehicle 1302 has moved closer to the traffic light 1300 than shown in FIGS. 15A and 15B. In this scenario, the LiDAR system 1304 is unable to completely resolve the traffic light 1300 because at least a portion of the traffic light 1300 is outside of the field of view 1402 of the LiDAR system 1304.

Figure 15D:
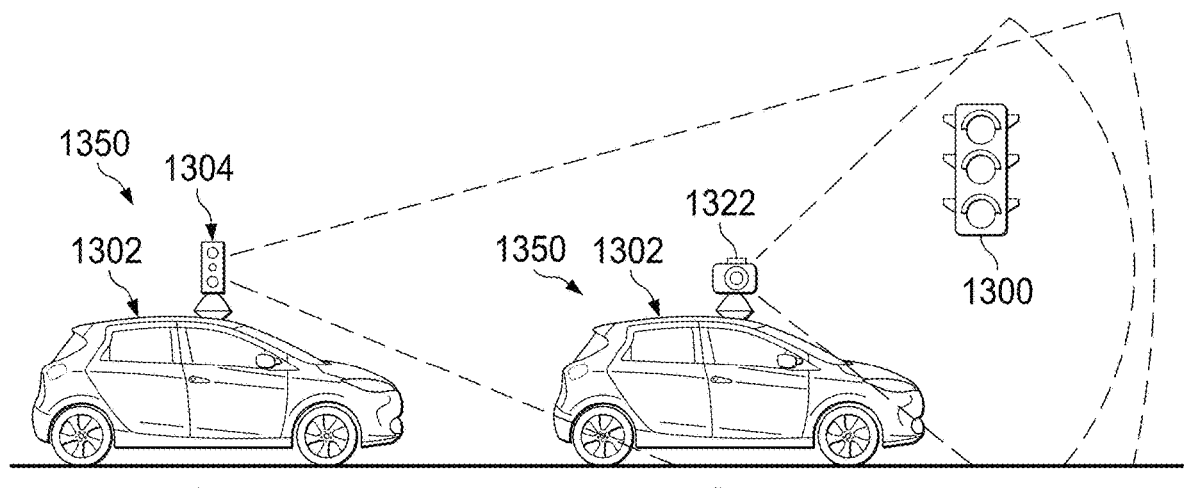

FIG. 15D shows a composite where the image merging system 1350 of the vehicle 1302 instructs the LiDAR system 1304 to acquire LiDAR information first (e.g., before the camera system 1322). This is represented in state A of FIG. 15D. Then, the image merging system 1350 of the vehicle 1302 instructs the camera system 1322 to acquire camera information after a time has passed. This is shown in state B of FIG. 15D. In this way, the acquisition of LiDAR information from the LiDAR system 1304 and camera information from the camera 1322 is temporally offset to account for the field of view differences between the LiDAR system 1304 and the camera system 1322. In the scenario shown in FIG. 15D, LiDAR information is acquired from the LiDAR system 1304 at state A and, about 2 seconds later, camera information is acquired from the camera system 1322 at state B.

In some examples, the image merging system 1350 of the vehicle 1302 determines from the LiDAR information that a traffic light is 10 meters away but camera information received from the camera system 1322 is insufficient to resolve the traffic light. In this scenario, perhaps only a few pixels of the camera information represent the traffic light. In some examples, less than 10% of pixels of the camera information represent features of the traffic light and is considered insufficient to resolve the traffic light.

In an embodiment, the LiDAR information includes information from more than one scan (e.g., 2 to 20 LiDAR scans such as 10 LiDAR scans). In an embodiment, the time delay between the acquisition of the LiDAR information and the camera information is based on the travel time of the vehicle 1302. In some examples, the travel time is estimated, by the image merging system 1350, based on a location difference between a location of the vehicle 1302 when acquiring the LiDAR information and a location of the vehicle 1302 when acquiring the camera information. In some examples, the travel time is estimated, by the image merging system 1350, based on a velocity of the vehicle 1302.

In some embodiments, the image merging system 1350 of the vehicle 1302 determines an accuracy based on the number of pixels representing features of the traffic light 1300. In some scenarios, the image merging system 1350 of the vehicle 1302 determines the accuracy based on the number of pixels representing features of the traffic light 1300 exceeding a threshold value (e.g., 100 pixels is associated with good accuracy, 10 pixels is associated with poor accuracy). In these examples, the accuracy is based on a number of pixels associated with the object 1300 (e.g., used to resolve the object).

In some examples, the accuracy is based on the distance between the vehicle 1302 and the traffic light 1300 (e.g., the image merging system 1350 of the vehicle 1302 determines an accuracy based on a physical distance to the traffic light 1300). In some examples, as the vehicle 1302 moves closer to the traffic light 1300 (e.g., after 2 seconds has elapsed), the camera information is reacquired and more (e.g., several hundred) pixels are associated with the traffic light 1300 compared to the image information from 2 seconds prior.

In some examples, the image merging system 1350 determines a confidence based on the accuracy and/or information from an external server, database, or map. For examples, in some cases, when the image merging system 1350 receives an indication from the server, database, or map that a traffic light is approaching, the image merging system 1350 determines if the accuracy of the detected object is above a threshold value (e.g., based on a number of pixels, etc.). In the case of the accuracy of the detected object being above the threshold value, a high confidence is associated with the detected object. On the other hand, in the case of the accuracy of the detected object being below the threshold value, a low confidence is associated with the detected object. In these cases, the confidence represents how confident the vehicle 1302 is that the object 1300 ahead is in fact a traffic light. In some examples, the trajectory of the vehicle 1302 and/or the path planning of the vehicle 1302 is based on the confidence. In some examples, the vehicle 1302 ignores detected objects when the confidence is low (e.g., below 5%). In some examples, the vehicle 1302 uses additional resources (passenger confirmation, external map information, etc.) to confirm the presence of the object when the confidence is low.

In some embodiments, the image merging system 1350 of the vehicle controls a zoom feature (e.g., optical zoom or digital zoom) of the camera system 1322 to zoom-in on the object 1300. In some cases, controlling the zoom feature is based the accuracy and/or the confidence. For example, when the accuracy (or confidence, or both accuracy and confidence) is/are below a threshold, the image merging system 1350 determines that a second look is warranted and controls (or instructs) the zoom feature of the camera system 1322 (or a second camera system) to optically zoom in with a 2× magnification. In some examples, the image merging system 1350 of the vehicle controls (or instructs) the camera system 1322 to pan to an area of the detected object based on the camera information (or merged information). Once the camera system 1322 is ready (zoomed and/or panned), the camera system 1322 then generates second camera information and transmits the second camera information to the image merging system 1350 of the vehicle. The image merging system 1350 analyzes the second camera information similar to the first camera information. In some embodiments, a second camera system is used to acquire the second camera information.

Similarly, in some embodiments, a second LiDAR system is used to acquire second LiDAR information. For example, when the accuracy (or confidence, or both accuracy and confidence) is/are below a threshold, the image merging system 1350 determines that a second look is warranted and controls (or instructs) a zoom feature of the LiDAR system 1304 (or a second LiDAR system) to optically zoom in with a 2× magnification. In some examples, the image merging system 1350 of the vehicle controls (or instructs) the LiDAR system 1304 to pan to an area of the detected object based on the LiDAR information (or merged information). Once the LiDAR system 1304 is ready (zoomed and/or panned), the LiDAR system 1304 then generates second LiDAR information and transmits the second LiDAR information to the image merging system 1350 of the vehicle. The image merging system 1350 analyzes the second LiDAR information similar to the first LiDAR information.

In an embodiment, LiDAR information is continuously acquired for a period of time (e.g., up to 10 seconds) and stored within a memory buffer of the vehicle 1302. In some embodiments, LiDAR information is retrieved, by the image merging system 1350 of the vehicle 1302, from the memory buffer for processing.

Once the image merging system 1350 of the vehicle 1302 has access to LiDAR information and camera information representing the environment of the vehicle 1302 (e.g., by acquisition or by buffer), the image merging system 1350 begins a merging process. The image merging system 1350 associates at least one portion of the LiDAR information with at least one pixel of the camera information to improve the vehicle's understanding of the environment. Typically, the at least one pixel of the camera information represents an object of particular interest (e.g., a stop sign, a traffic light, a vehicle, etc.).

Referring back to the example shown in FIG. 15D, in this scenario, the camera information associated with the camera system 1322 is merged, by the image merging system 1350 of the vehicle 1302, with the corresponding LiDAR information from 2 seconds prior. In other examples, the acquisition of the LiDAR information and the camera information occur simultaneously.

Through the merging process, the image merging system 1350 synchronizes the respective fields of view of the LiDAR system 1304 and the camera system 1322 with each other. In some examples, the image merging system 1350 compares image features (e.g., edges, faces, colors, etc.) of the camera information with the LiDAR information previously acquired to determine the synchronization.

Figure 16A:
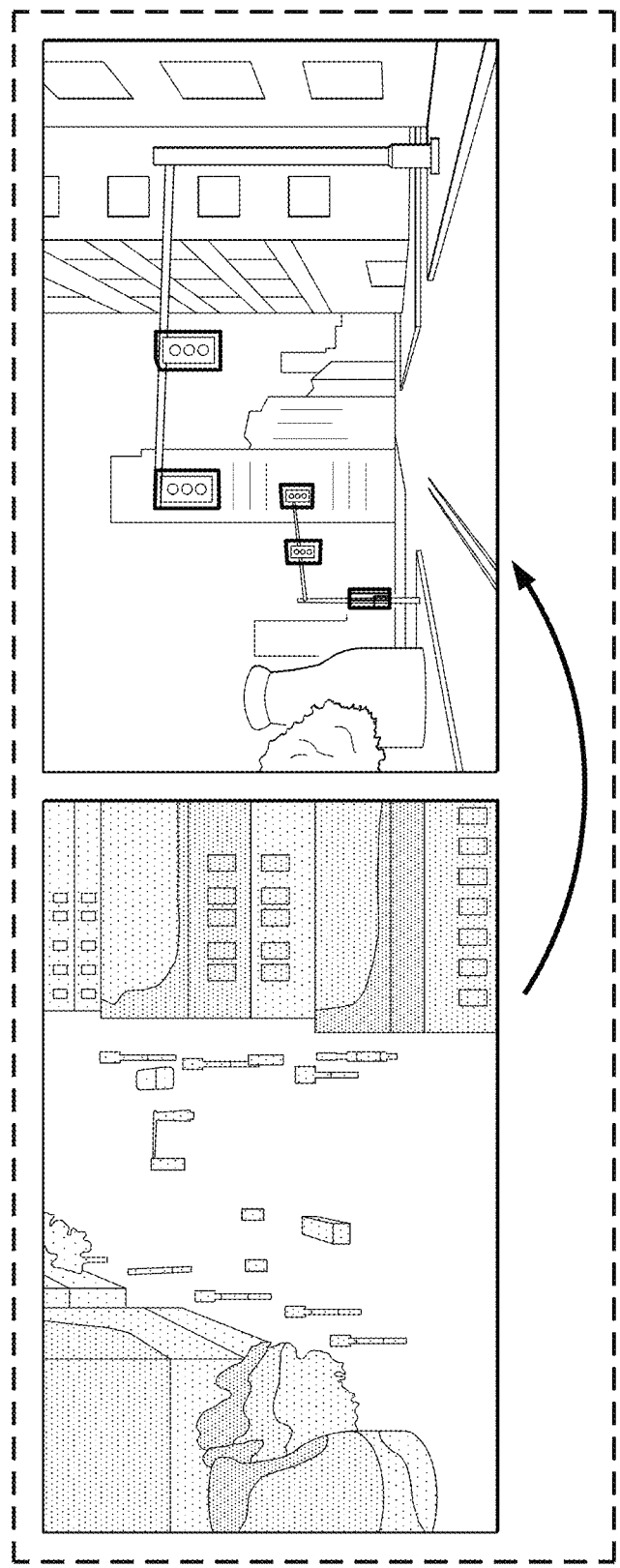
FIG. 16A illustrates a merging process between LiDAR information and camera information.

FIG. 16A is an illustration of the merging process of LiDAR information from the LiDAR system 1304 with camera information from the camera system 1322. As previously described, the image merging system 1350 associates at least one portion of the LiDAR information with at least one pixel of the camera information. In some examples, the image merging system 1350 of the vehicle 1302 merges the LiDAR information with the camera information based on a relative distance between the LiDAR system 1304 and the camera system 1322. In some examples, the image merging system 1350 of the vehicle 1302 merges the LiDAR information with the camera information based on a ratio of the field of view of the LiDAR system 1304 to the camera system 1322.

In an embodiment, the image merging system 1350 determines an alignment between respective features of the LiDAR information and the camera information based on features represented in both the LiDAR information and the camera information. In some examples, feature gradients such as sharp edges are distinguishable in both the LiDAR information and the camera information and are used by the image merging system 1350 to merge the LiDAR information to the camera information. In this scenario, edges in the camera information are aligned with gradients in the LiDAR information.

In some embodiments, the image merging system 1350 merges all the LiDAR information with the camera information. In some embodiments, the image merging system 1350 merges portions of the LiDAR information with the camera information. For example, the image merging system 1350 selects regions of particular interest from the LiDAR information, merges these regions with the camera information, and discards the remaining portions of the LiDAR information. As described with respect to FIG. 13B above, in some examples, the regions of LiDAR information of particular interest are LiDAR point clusters. One or more LiDAR point clusters are present within the LiDAR information and are determined by the image merging system 1350 of the vehicle 1302.

In some embodiments, the image merging system 1350 determines a mapping for each LiDAR point cluster within the LiDAR information. In some examples, the merging process is performed independently for each LiDAR point cluster. In this scenario, the image merging system 1350 determines a mapping representing a best fit mapping between the respective LiDAR point cluster and the one or more pixels of the camera information. In this way, the image merging system 1350 associates object information of one or more pixels of the camera information with LiDAR point clusters of the LiDAR information. The merging of LiDAR information with camera information enables the image merging system 1350 to query a region of the merged information and retrieve respective LiDAR information and camera information. As an example, when the image merging system 1350 inquires about a status or property (e.g., color, intensity, position, etc.) of the regions within the merged LiDAR information and camera information, the image merging system 1350 receives information associated with both LiDAR information (such as distance information, time of LiDAR acquisition, etc.) associated with LiDAR points within the regions and camera information (such as color, intensity, 2D position, etc.). For example, in scenarios where the detected object is a traffic light, the image merging system 1350 inquires on the color of pixels associated with the merged information to infer which traffic instruction (e.g., green-go, yellow-yield, and red-stop) is being instructed by the traffic light. In these cases, color and intensity information is retrieved from the camera information part of the merged information and orientation and distance information is retrieved from the LiDAR information part of the merged information. In some examples, when the image merging system 1350 determines that the intensity is above a threshold, the image merging system 1350 controls the vehicle to respond to the traffic instruction.

Figure 16B:
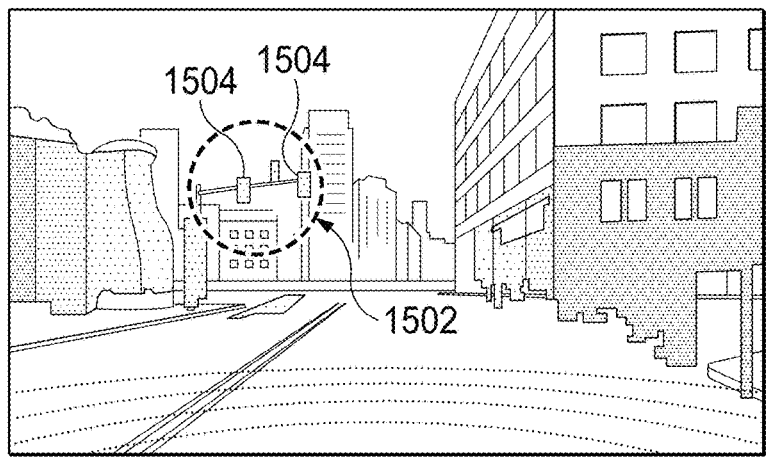
FIG. 16B shows a composite image using the LiDAR information and camera information.

FIG. 16B shows a composite image in which LiDAR information (represented using dots in FIG. 16B) from the LiDAR system 1304 is merged with camera information (represented using lines in FIG. 16B) from the camera system 1322. In particular, FIG. 16B shows that physical objects in the environment (e.g., edges of buildings, traffic lights, etc.) are associated with both camera information and LiDAR information.

In the example shown in FIG. 16B, a pair of traffic lights 1504 within a region 1502 are associated with both camera information and LiDAR information. Bounding boxes, or edges, of the traffic lights 1504 are shown in a bolded outline. In some examples, the image merging system 1350 determines or receives bounding box information from the segmentation and annotation process. In some examples, the segmentation and annotation process of the vehicle 1302 identifies objects of interest (e.g., traffic lights 1502, stop signs, pedestrians, etc.) represented in the camera information and associates one or more pixels of the camera information that represent these objects with bounding boxes. In some examples, the bounding box is determined based on the camera information without considering the LiDAR information. In some examples, the bounding box is determined based on objects of interest (e.g., a classification of an object of interest). For example, in some cases, the segmentation and annotation process determines bounding boxes for all detected objects, but the image merging system 1350 filters (ignores) all detected objects within certain categories (e.g., ignores all bounding boxes associated with category 3, etc.).

In an embodiment, the image merging system 1350 determines LiDAR information located within the bounding box (e.g., within the boundaries defined by the edges). In some examples, the image merging system 1350 determines a distance from the vehicle 1302 to the traffic lights 1502 based on an average distance associated with LiDAR information within the bounding box.

In an embodiment, the image merging system 1350 determines a distance in the environment from the vehicle 1302 to the object using the merged LiDAR information encapsulated by the bounding boxes. In some examples, the distance is used by the image merging system 1350 of the vehicle 1302 for control purposes and map annotation. In some examples, the image merging system 1350 controls the vehicle 1302 in response to the determined distance using the merged LiDAR information and camera information.

In some examples, the position of the object within a map is annotated, by associating each traffic light with a position in the environment, to denote that a traffic light exists at a certain position. In some examples, the map is a global map. In an embodiment, the map is used by other vehicles to anticipate the position of traffic lights within the environment. In some examples, the position of the object is determined by the image merging system 1350 of the vehicle 1302 based on the location of the vehicle 1302 (e.g., as received by a GPS sensor, as determined by a localization system or module, and/or the like), the position, orientation, and field of view of the camera system 1322, and the position, orientation, and field of view of LiDAR system 1304.

In an embodiment, the image merging system 1350 determines an instance identifier (id) of the object. The instance identifier of the object is used for tracking the object through the environment. In some examples, the instance identifier is a unique number for tracking purposes.

For example, when the vehicle 1302 identifies a new (e.g., not previously observed) traffic light, the image merging system 1350 of the vehicle 1302 assigns the new traffic light to category 1 along with the position information of the new traffic light. As the vehicle 1302 moves though the environment, the image merging system 1350 of the vehicle continuously observes the object and verifies which object is the same and which objects are new based on the instance identifier. In a scenario, the vehicle 1302 turns a corner and observes a new traffic light ahead. Subsequently, the image merging system 1350 determines this and assigns it to a new instance identifier (e.g., a numeral associated with the instance identifier is incremented).

In an embodiment, the instance identifier is based on the confidence. For example, as the vehicle 1302 gets closer to the object, the image merging system 1350 determines with a higher confidence that the object is actually a traffic light (e.g., based on a determination that there is more LiDAR information and camera information of the object available via the sensors of vehicle 1302).

In an embodiment, the image merging system 1350 continuously updates the position information of the object. For example, the estimated position associated with an object (e.g., the position of the object relative to a pre-generated 3D map, the position of the object relative to one or more buildings in an area, and/or the like) 10 meters away from the vehicle 1302 will be typically less accurate that the estimated position information when only 1 meter away. In this way, the image merging system 1350 retains position information with the highest confidence. In some examples, this position information is stored within memory of the vehicle 1302, or a remote database or map.

In an embodiment, the image merging system 1350 updates the classification over time. In some examples, the image merging system 1350 updates the classification of an object (e.g., from category 3 to category 2). For example, in a scenario, from a distant perspective the image merging system 1350 of the vehicle 1302 determines that a pedestrian is ahead and assigns the associated merged LiDAR information to category 3, but as the vehicle 1302 approaches the image merging system 1350 realizes that the pedestrian classification is incorrect and that the object is actually a stop sign and updates the classification information to category 2.

In an embodiment, the image merging system 1350 updates the instance identifier based on subsequent merged LiDAR information and camera information. In some examples, the image merging system 1350 of the vehicle 1302 determines that a single traffic light is ahead, but as the vehicle 1302 approaches, the image merging system 1350 realizes the traffic light is actually two traffic lights. In this scenario, the image merging system 1350 continuously determines whether the object has split into multiple objects. Here, the traffic light that was originally assigned to a single instance identifier by the image merging system 1350, is split into two traffic lights and each traffic light is assigned a unique instance identifier by the image merging system 1350 of the vehicle 1302. In this way, instance identifiers of the object are updatable.

In an embodiment, the image merging system 1350 determines an orientation of the object (e.g., an orientation representing a direction an instruction of the object is facing). In some examples, a traffic light ahead that is aimed at a lane other than the lane of the vehicle 1302 (e.g., a traffic instruction of the traffic light is not directed to the vehicle 1302) is used for updating a map despite not being aimed in the path of the vehicle 1302. In other words, in some cases, the presence and orientation of the traffic light is updated in the map regardless of whether the traffic light is in the path of the vehicle 1302.

In an embodiment, determining the orientation is based on features of the object itself (e.g., edges, colors, proportions, etc.). In an embodiment, the image merging system 1350 determines a direction based to the orientation. In some examples, an edge of a stop sign surface is used to infer a direction normal to the surface of the stop sign (e.g., inferred by computing a vector cross product of a surface spanned by the LiDAR point clusters representing the surface). In another example, an edge of a traffic light is used to infer a direction of the traffic light (e.g., to represent where the traffic signal and hence traffic instruction is directed). In some examples, the image merging system 1350 controls the vehicle based on the orientation of the detected object. For example, if the image merging system 1350 determines that the direction the traffic light is directed toward the vehicle (e.g., by determining when a vector dot product between the direction the detected object is directed and a direction of travel of the vehicle is above a threshold), the vehicle is controlled to respond to the traffic signal of the traffic instruction of the traffic signal. In other cases, the controller of the vehicle does not respond to the traffic instruction of the traffic light when the image merging system 1350 determines that the direction the traffic light is not directed toward the vehicle (e.g., by determining when a vector dot product between the direction the detected object is directed and a direction of travel of the vehicle is below a threshold).

In an embodiment, the image merging system 1350 of the vehicle 1302 builds a 3D representation of the object as the vehicle 1302 traverses the environment of the object. In an embodiment, the 3D representation is used to determine the orientation of the object.

Figure 16C:
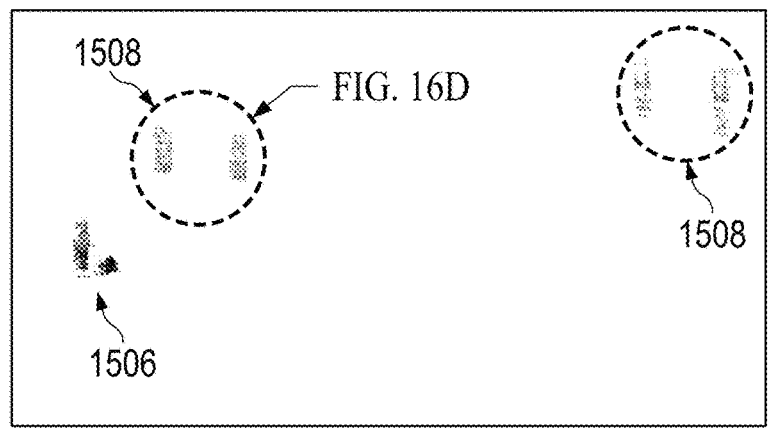
FIG. 16C shows LiDAR points of the LiDAR information associated with a traffic light.

FIG. 16C shows LiDAR information that is encapsulated by bounding boxes (not shown). In contrast with the LiDAR image 1320 shown in FIG. 13B that shows all LiDAR information, FIG. 16C shows LiDAR information that is encapsulated by the one or more bounding boxes. In this way, the one or more bounding boxes serve as a filter of LiDAR information and only LiDAR information within the one or more bounding boxes persist after this filtering process.

Figure 16D:
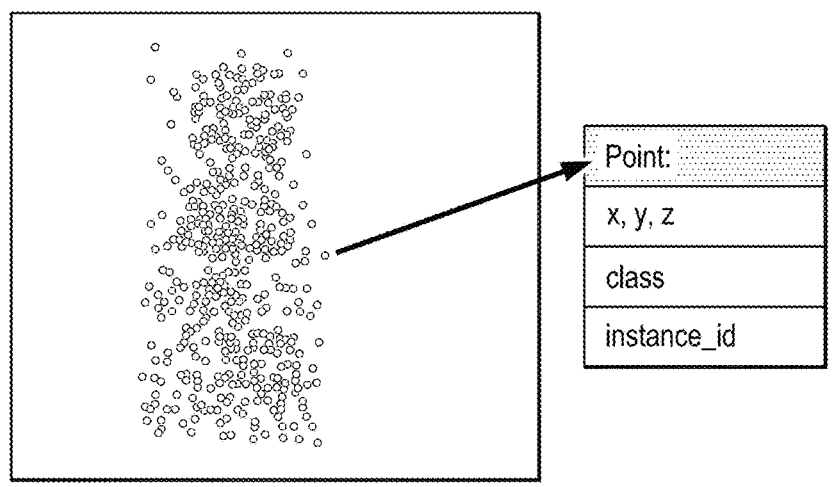
FIG. 16D shows LiDAR information associated with the LiDAR points.

FIG. 16D shows a detail view of LiDAR information associated with one of the traffic lights of FIG. 16C. In particular, FIG. 16D shows each LiDAR point associated with a LiDAR point cluster representing a traffic light and respective properties for each LiDAR point.

The image merging system 1350 of the vehicle 1302 determines the respective properties based on the merged LiDAR information and camera information. In the example shown, each LiDAR point is annotated by the image merging system 1350 to include position information (e.g., x, y, z), classification information (e.g., a "class" parameter), and instance information (e.g., an "instance_id" parameter). In some examples, each LiDAR point is annotated with other information (e.g., physical properties (e.g., color, size, etc.), status (e.g., temporary, last observed, etc.), etc.).

Figures 17A, 17B, 17C, 17D, 17E, 17F:
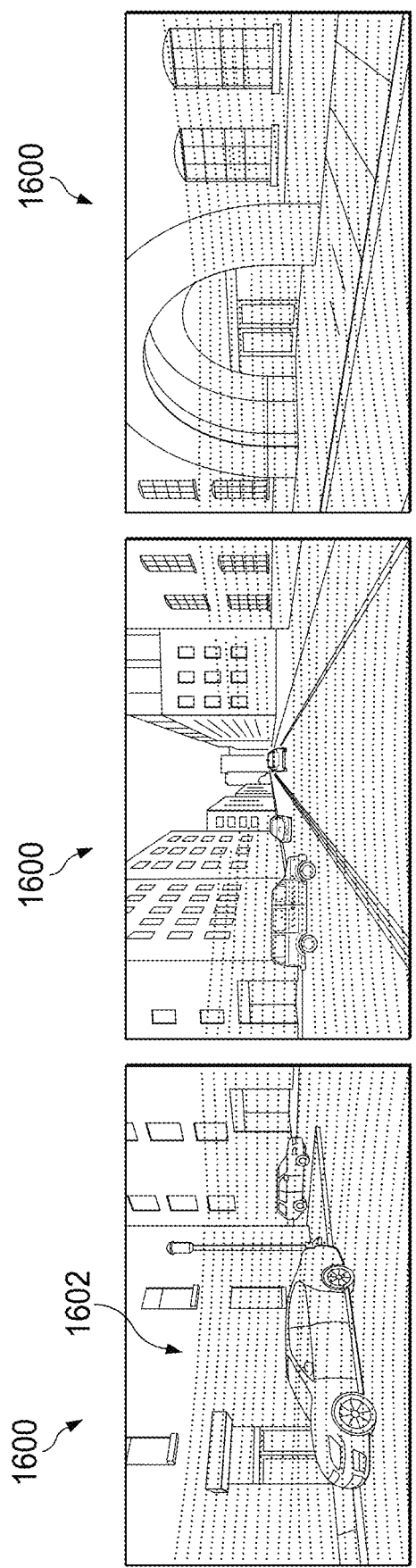
FIGS. 17A-17F show a 360 degree composite image using the LiDAR information and camera information.

FIGS. 17A-17F illustrate an embodiment where the merging process is performed using LiDAR information and camera information representing a 360 degree view around the vehicle 1302. The image merging system 1350 of the vehicle 1302 forms a composite representation 1600 representing the merging of LiDAR information with camera information. In this example, the camera information represents six camera images acquired from the camera system 1322 of the vehicle 1302. In this example, FIG. 17B represents the environment directly in front of the vehicle 1302, FIG. 17E represents the environment directly behind the vehicle 1302, FIG. 17A represents the environment to the front left of the vehicle 1302, FIG. 17C represents the environment to the front right of the vehicle 1302, FIG. 17D represents the environment to the rear right of the vehicle 1302, and FIG. 17F represents the environment to the rear left of the vehicle 1302. The composite representation 1600 defines a complete 360 degree view around the vehicle 1302. The image merging system 1350 of the vehicle merges the LiDAR information with the camera information spanning the complete 360 degree view. In this way, the image merging system 1350 of the vehicle 1302 determines a distance of each respective object around a 360 degree view of the vehicle 1302.

Figure 18:
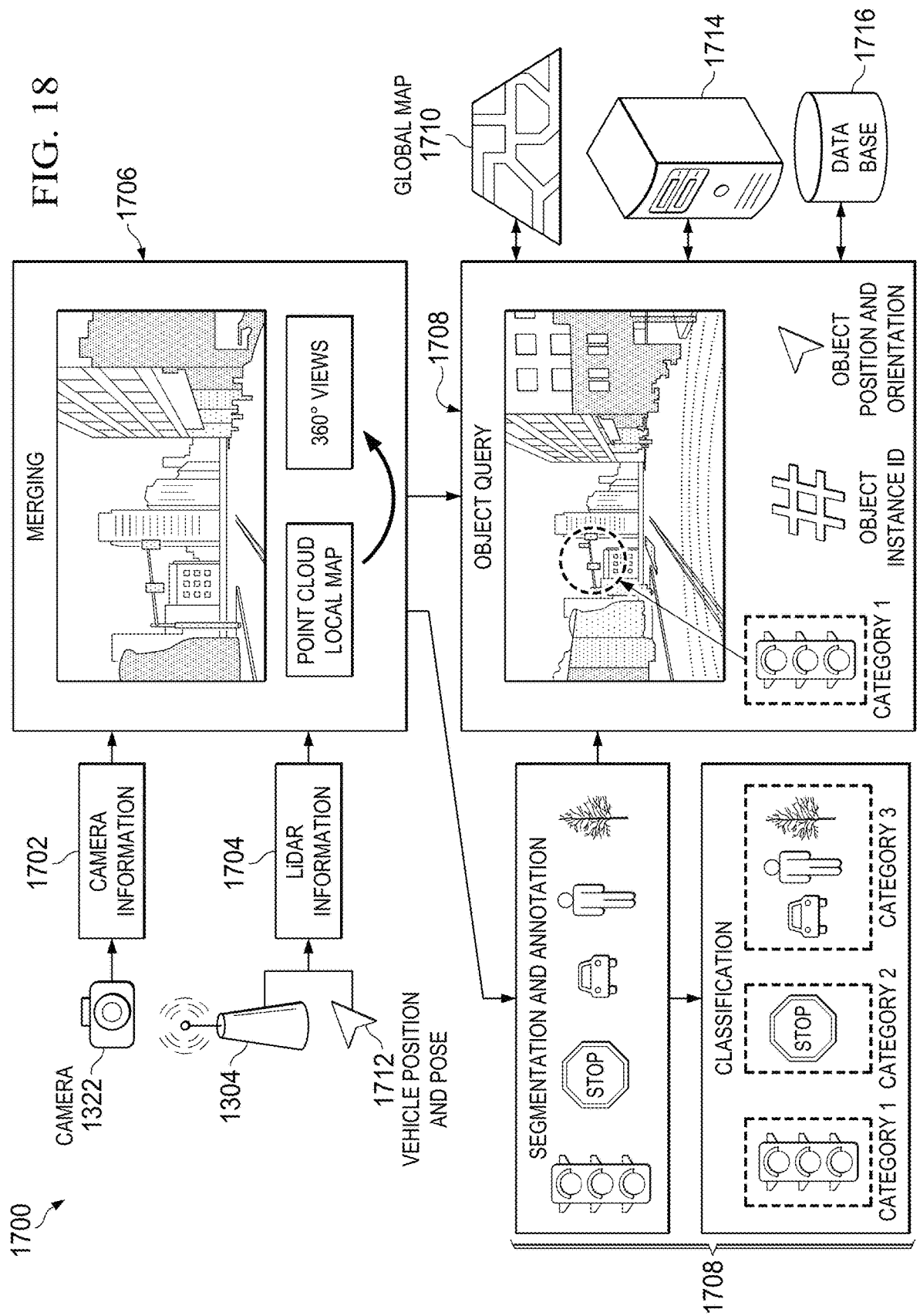
FIG. 18 shows a block diagram of the merging process.

FIG. 18 is a flowchart of an embodiment of an image merging process 1700 of merging LiDAR information with camera information. The image merging process 1700 is implementable using the at least one processor of the image merging system 1350 of the vehicle 1302 or the at least one processor of the remote server (e.g., cloud server 136 or cloud computing environment 200). While the image merging process 1700 illustrates a particular flow of information, embodiments of the merging LiDAR information with camera information are not limited to a particular flow of information.

The at least one camera 1322 is used to acquire camera information 1702. In some examples, the camera information 1702 represents a 360 degree view around the vehicle 1302.

The at least one LiDAR system 1304 is used to acquire LiDAR information 1704. In some examples, the image merging system 1350 of the vehicle receives vehicle position and orientation information 1712 of the vehicle 1302 along with the LiDAR information 1704.

The LiDAR information from the LiDAR system 1304 and the at least one camera 1322 are used in the merging process 1706. In other words, the LiDAR information from the LiDAR system 1304 and the at least one camera 1322 are received by the image merging system 1350 when the image merging system 1350 implements the process of the merging process 1706.

While performing the merging process 1706, the image merging system 1350 determines the best fit of merging the LiDAR information with the camera information and generates merged information based on the LiDAR information and the camera information.

The process 1700 includes a segmentation, annotation, and classification process 1708. In the example shown, the merged information from the merging process 1706 is used by the segmentation, annotation, and classification process 1708. However, in some examples, the segmentation, annotation, and classification process 1708 is performed before the merging process 1706 (e.g., using either camera information or LiDAR information alone).

In the example shown, the image merging system 1350 associates objects with three categories (category 1 being traffic lights, category 2 being traffic signs, and category 3 being everything else) while implementing the segmentation, annotation, and classification process 1708. The category information is included in classification information that is associated with each object. In this way, each object includes classification information. In some examples, an instance identifier is assigned as part of the segmentation, annotation, and classification process 1708 and included in the classification information.

In an embodiment, an object query process 1708 is included in the process 1700. While performing the object query process 1708, the image merging system 1350 iterates (e.g., loops) over each instance identifier in each category to determine an action of the vehicle 1302. In some examples, the image merging system 1350 updates a map 1710 with the object information (e.g., category, instance identifier, position and orientation). In some examples, this map is queried by other vehicles and respective processors of the other vehicles use this map to determine when to anticipate upcoming traffic lights or traffic signs.

In an embodiment, the image merging system 1350 also determines whether to store the information associated with the object in a server (such as server 1714) or database (such as database 1716). In an embodiment, the image merging system 1350 stores the information associated with the object in the server or database. Similarly, in an embodiment, the image merging system 1350 retrieves object information from the server, database, or map, updates the object information accordingly, and sends the object information back to the server, database, or map.

Figure 19B:
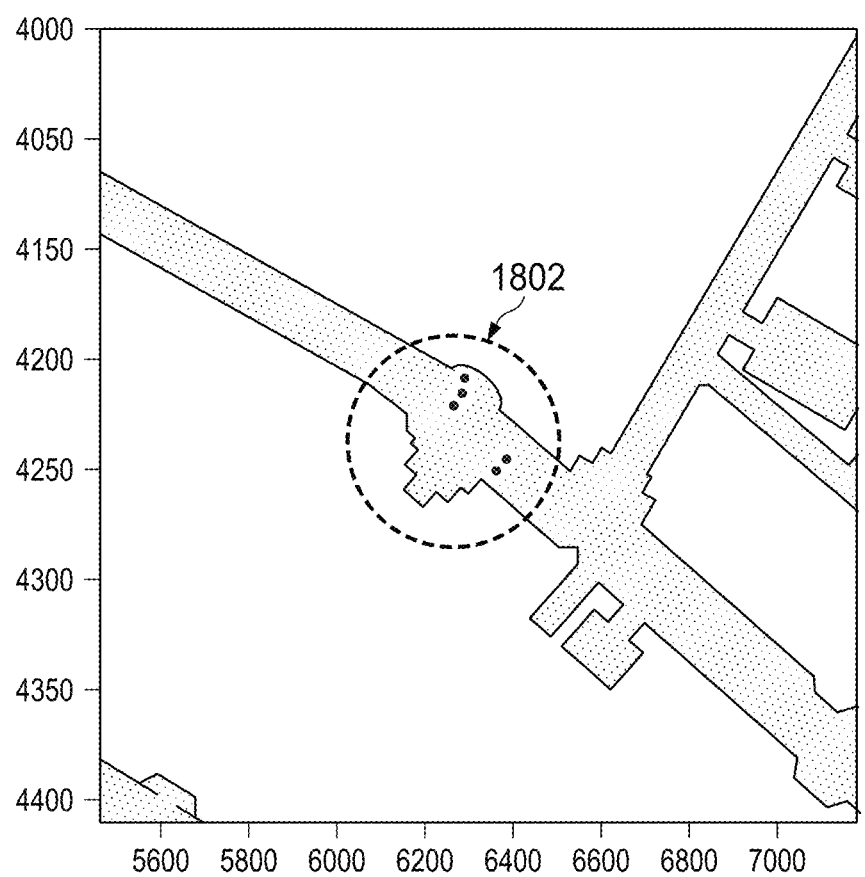

FIGS. 19A-19B show details of the global map 1710. The map 1710 includes roads of the environment. The map 1710 is shown with X coordinates on the horizontal axis and Y coordinates on the vertical axis. Z coordinates are not shown for brevity, but in some embodiments, are included in the information stored in the global map 1710 to denote height of the object off of the ground (or above sea level). In the example shown in FIG. 19B, the global map 1710 includes the location of five objects within a region 1802. The five objects are stored in the global map 1710. When the image merging system 1350 retrieves object information from the map 1710, information regarding the five objects is transmitted to the image merging system 1350.

In an embodiment, after the image merging system 1350 of the vehicle 1302 identifies a traffic light ahead, the image merging system 1350 compares the position of the traffic light with known instances of objects in the global map 1710. For example, if the global map 1710 indicates a traffic light at a particular location ahead, the image merging system 1350 of the vehicle 1302 adopts the instance identifier of the traffic light and downloads the associated information of the traffic light from the global map 1710. For example, in some cases the position information of an object included in the map is more accurate than the current position estimated by the image merging system 1350 of the vehicle 1302. In other examples, the object is too far away from the vehicle 1302 to determine an orientation of the object so it is downloaded by the global map 1710 instead and adopted by the image merging system 1350 as the orientation of the object. In this way, the global map 1710 is annotated with current, up to date, estimates of the position and orientation of all objects in category 1 and 2 that have been observed by an image merging system 1350 of a vehicle at least once.

In an embodiment, the number of times the object has been observed is also stored on the global map 1710. In some examples, the number of times the object has been observed is indicative of a probability that the object exists. For example, in some cases, if an object is observed at least once per day, the object is associated with a high probability that the object exists. On the other hand, in some cases, if an object is observed less than once per year (e.g., once a week, once a month, and/or the like), the object is associated with a low probability that the object exists. In some examples, if an object is removed, or is moved, the map is updated accordingly. In an embodiment, the object remains on the global map 1710, but the object is associated with information that indicates that the object may not exist since at least one instance exists where an image merging system 1350 of a vehicle did not detect the object (e.g., when there is contradicting information associated with an object). In an embodiment, dates and times associated with the information are stored on the global map 1710. In some examples, dates and time information are used to give the image merging system 1350 an indication of information reliability. In some examples, a newly identified object (e.g., observed two days ago) is considered more reliable that an object last observed a year ago.

In an embodiment, this information is part of the global map 1710 and used in the route planning process. In some examples, if the route planner receives an indication that ten traffic lights exist along a path, the route planner reroutes the vehicle 1302 for fuel and/or energy efficiency reasons and/or for travel time considerations. In an embodiment, passenger comfort is considered based on the number of objects identified in the global map 1710 along particular routes. In some examples, a route with ten stop signs is less comfortable to a passenger that has motion sickness than a route that is longer (distance-wise and/or time-wise) but includes less stops (e.g., highway travel).

Figure 20:
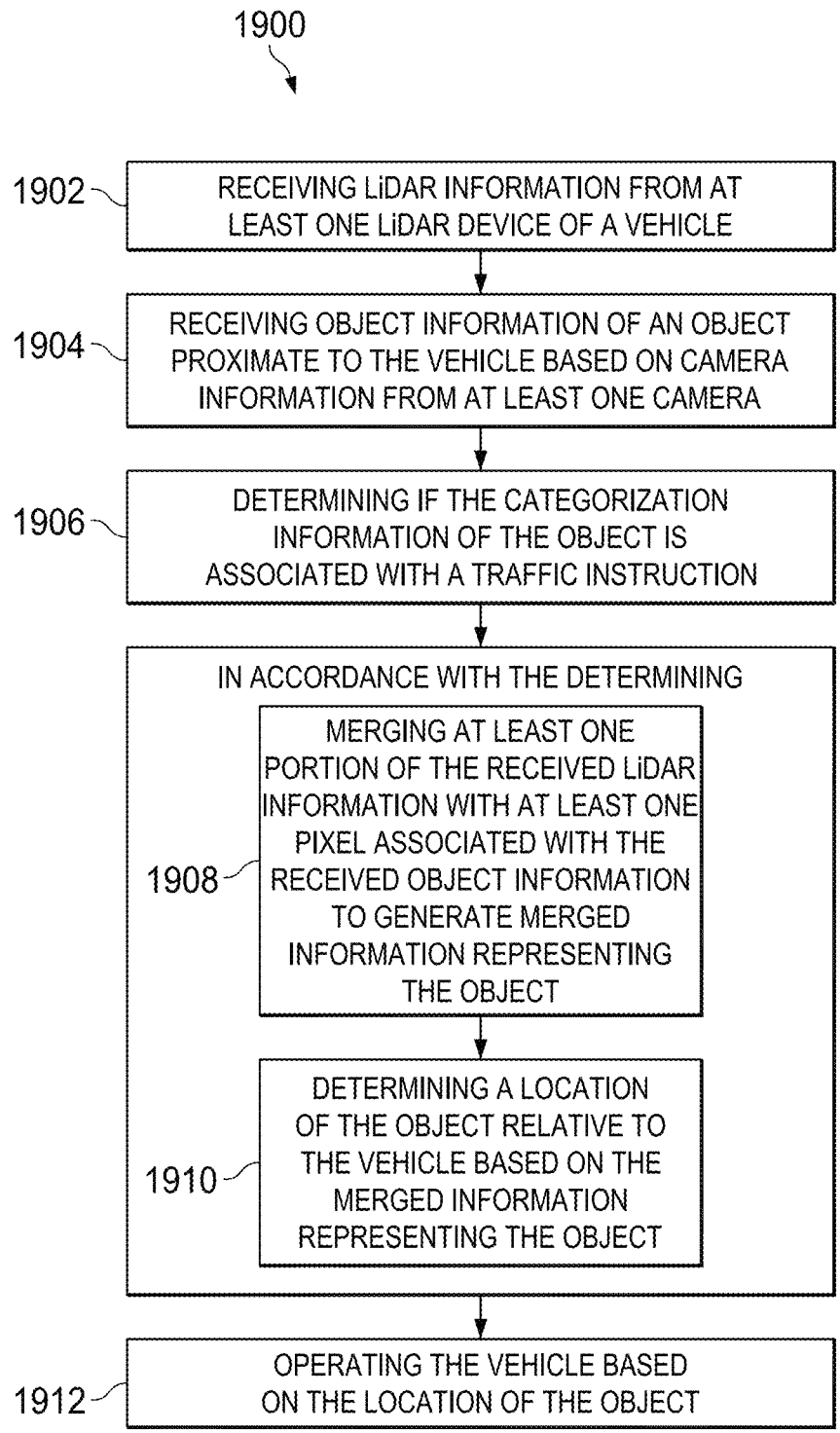
FIG. 20 is a flowchart for the merging process.

FIG. 20 is a flowchart of the image merging process 1900 of LiDAR information with camera information.

The image merging process 1900 is performed by the at least one processor of the image merging system of a vehicle (such as the image merging system 1350 of vehicle 1302) having at least one LiDAR device (such as the LiDAR device or LiDAR system 1304) configured to detect electromagnetic radiation (e.g., light) in the ultraviolet, infrared, or laser spectra, or any other kind of electromagnetic radiation. The vehicle includes at least one camera (such as the camera 1322) configured to generate camera information of the objects proximate to the vehicle in a field of view of the camera. The vehicle includes at least one processor configured to implement the operation/steps of the image merging process 1900. The at least one processor performs some or all of the operations/steps of the image merging system.

The image merging system receives 1902 LiDAR information from the at least one LiDAR device. In some examples, the LiDAR information covers a 360 degree azimuth around the vehicle. In an embodiment, the LiDAR information includes multiple LiDAR scans using the LiDAR system 1304 and is received in real-time by the image merging system.

The image merging system receives 1904 object information of an object proximate to the vehicle based on camera information from the at least one camera. In an embodiment, the object information includes at least one pixel of the camera information representing the object. In an embodiment, the object information includes categorization information representing a classification of the object. In an embodiment, the image merging system receives the camera information.

In some examples, categorization information associates a pixel with an object. For example, if at least one pixel of the image is determined to represent a traffic light, this association is included in the categorization information. In an embodiment, the segmentation and annotation process determines which pixels of the image correspond to objects (e.g. a first set of pixels correspond to a traffic light, a second set of pixels correspond to a pedestrian, etc.).

In an embodiment, the classification represents a category for these objects (e.g., category 1 is a traffic light, category 2 is a traffic sign, and category 3 is everything else). In a broader context, a category is grouping of objects with at least one common feature. For example, in an embodiment, categories 1 and 2 include all traffic instructions (e.g., stop sign, yield sign, school zone sign, traffic light, speed limit signs, merge lane signs, etc.) and category 3 includes everything that is not a traffic instruction (e.g., a tree, a building, a vehicle, a parking meter, etc.). In this context, the common feature is traffic instruction. In general, in some examples, a traffic instruction refers to any explicit instruction received by the vehicle used to navigate through the environment (e.g., a stop sign includes an explicit traffic instruction to stop, a yield sign includes an explicit instruction to yield to other vehicles, a speed limit sign includes an explicit instruction not to exceed the stated speed limit, and/or the like).

In an embodiment, the image merging system determines 1906 if the categorization information of the object is associated with a traffic instruction. In some examples, the operation of the vehicle is based on the whether or not a traffic instruction is ahead of the vehicle (e.g., stop at a stop light, slow down in a school zone, etc.). In some examples, the traffic instruction is a traffic light or a traffic sign. In an embodiment, the image merging system determines a traffic signal of the traffic instruction based on the merged information. In some examples, the image merging system infers the signal of the traffic light based on a color of at least one pixel in the merged information (e.g., red, yellow, or green means stop, yield, and go, respectively). In an embodiment, the image merging system infers the traffic signal based on a position of peak light intensity of light emitted from the object (e.g., if a bright light is emitted near the top of the object, it is inferred to represent a stop instruction).

In an embodiment, the control circuit of the vehicle is further configured to operate the vehicle based on the traffic signal of the traffic instructions.

In accordance with determining that the categorization information of the object is associated with the traffic instruction, the image merging system merges 1908 at least one portion of the received LiDAR information with at least one pixel associated with the received object information to generate merged information representing the object. In an embodiment, the image merging system filters the merged information based on the categorization information. In an embodiment, merging the at least one portion of the received LiDAR information with the at least one pixel associated with the received object information comprises merging a plurality of LiDAR points within a bounding box of the camera information.

The image merging system determines 1910 a location of the object relative to the vehicle based on the merged information representing the object. In an embodiment, the image merging system determines an orientation of the object based on the merged information.

In an embodiment, the image merging system operates 1912 the vehicle based on the location of the object. In an embodiment, the image merging system causes a separate controller of the vehicle to operate the vehicle based on the location of the object. In some examples, the image merging system notifies a vehicle controller that a traffic light is approaching with a red traffic signal (e.g., stop signal), and in response, the vehicle is controlled to stop the vehicle before the object (e.g., within a distance from the object).

In an embodiment, the image merging system assigns an instance identifier to the object based on the merged information (e.g., object #1, object #2, etc.). In an embodiment, the image merging system determines that the object is already associated with an instance identifier. In an embodiment, if the image merging system determines that the object is not associated with an instance identifier, the image merging system assigns an instance identifier to the object.

In an embodiment, the image merging system determines if the object represents two distinct objects based on the merged information. In accordance with determining if the object represents two distinct objects, the image merging system assigns a unique instance identifier to each of the two distinct objects.

In an embodiment, the image merging system determines an accuracy of the object based on the merged information.

In an embodiment, the image merging system annotates a map based on the merged information. In an embodiment, annotating a map includes transmitting the location of the object, the classification information of the object, an instance identifier of the object, and/or a date of observing the object to a database hosting the map. In an embodiment, the image merging system updates an existing instance of the object on a map based on the merged information. In an embodiment, the image merging system determines when the location or orientation of the object changes and removes the location and/or orientation information associated with the object from the map. In some examples, when a vehicle returns to a particular area of the environment, the image merging system determines that a previously detected traffic light is no longer present. In some cases, the image merging system transmits instructions to delete the traffic light from the map or database.

In an embodiment, the image merging system determines at least one geometric feature of the object based on the merged information. In an embodiment, determining the at least one geometric feature of the object includes determining at least one edge of the object and at least one surface of the object. In an embodiment, determining the at least one geometric feature of the object includes determining a size of the object. In some examples, an edge detection is performed on the merged information to determine an edge of the object and the orientation of the edge is used to infer an orientation of the object.

In an embodiment, the at least one camera acquires the camera information and the at least one LiDAR device acquires the LiDAR information concurrently. In an embodiment, the at least one camera acquires the camera information after the at least one LiDAR device acquires the LiDAR information. In an embodiment, a timing difference between when the at least one camera acquires the camera information and the at least one LiDAR device acquires the LiDAR information is based on a velocity of the vehicle.

In an embodiment, the image merging system receives updated LiDAR information from the at least one LiDAR device. For example, in an embodiment, updated LiDAR information is generated to confirm or reassess the position of the object that was previously detected. In an embodiment, acquiring updated LiDAR information is performed when the previous LiDAR information was acquired using less LiDAR points than a number of LiDAR points associated with the updated LiDAR information. In some examples, LiDAR information is acquired a second time to increase resolution in areas of the environment where a traffic instruction is likely (e.g., above the vehicle, on the sidewalks, etc.). In an embodiment, acquiring updated LiDAR information is performed when the previous LiDAR information was acquired using less than a full field of view of the LiDAR system (e.g., less than a 360 degree view around the vehicle) than an updated field of view associated with the updated LiDAR information.

In an embodiment, updated LiDAR information is acquired based on a previously detected object. In some examples, the previously detected object was detected based on a previous LiDAR information and previously merged information. In some examples, the updated LiDAR information is acquired when an accuracy of the object from previous merged information is below a threshold accuracy.

In an embodiment, the image merging system receives vehicle location information from at least one sensor of the vehicle wherein the vehicle location information includes a latitude and longitude of the vehicle. In this embodiment, a latitude and longitude of the object is determined based on the latitude and longitude of the vehicle. For example, using the current position of the vehicle, the image merging system determines the location in global coordinates of the objects and record the location in the map, database, or server.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A vehicle, comprising:
    at least one non-transitory computer-readable medium storing computer-executable instructions;
    at least one processor communicatively coupled to the at least one non-transitory computer-readable medium, the at least one processor configured to execute the computer executable instructions, the execution carrying out operations including:
        receiving LiDAR information from at least one LiDAR device;
        receiving object information of an object proximate to the vehicle based on camera information from at least one camera, the object information comprising at least one pixel of the camera information representing the object and the object information comprising categorization information representing a classification of the object that indicates a category or a type of the object;
        merging at least one portion of the received LiDAR information with at least one pixel associated with the received object information to generate merged information representing the object;
        determining a location of the object relative to the vehicle based on the merged information representing the object or a combination of the LiDAR information and the camera information;
        determining an accuracy of the object based on at least one of a number of pixels associated with the object, the location of the object relative to the vehicle, or the merged information representing the object; and
        determining a confidence level of the merged information actually representing the object based on the accuracy of the object, the confidence level representing how confident the vehicle is that the object proximate to the vehicle is in fact the object actually represented by the merged information; and
    a control circuit communicatively coupled to the at least one processor, the control circuit configured to operate the vehicle based on (i) the location of the object relative to the vehicle and (ii) the confidence level of the merged information actually representing the object.

2. The vehicle of claim 1, wherein the at least one processor is further configured to carry out operations including: filtering the merged information based on the categorization information.

3. The vehicle of claim 1, wherein the at least one processor is further configured to carry out operations including: determining an orientation of the object based on the merged information.

4. The vehicle of claim 1, wherein the at least one processor is further configured to carry out operations including determining if the categorization information of the object is associated with a traffic instruction, wherein the traffic instruction is a traffic light or a traffic sign.

5. The vehicle of claim 4, wherein the at least one processor is further configured to carry out operations including determining a traffic signal of the traffic instruction based on the merged information.

6. The vehicle of claim 5, wherein the control circuit is further configured to operate the vehicle based on the traffic signal of the traffic instruction.

7. The vehicle of claim 1, wherein the at least one processor is further configured to carry out operations including: assigning an instance identifier to the object based on the merged information.

8. The vehicle of claim 7, wherein the at least one processor is further configured to carry out operations including:
    determining if the object represents two distinct objects based on the merged information; and in accordance with determining if the object represents two distinct objects, assigning a unique instance identifier to each of the two distinct objects.

9. The vehicle of claim 1, wherein the at least one processor is further configured to carry out operations including: annotating a map based on the merged information.

10. The vehicle of claim 9, wherein annotating a map comprises transmitting the location of the object, the categorization information of the object, an instance identifier of the object, and a date of observing the object to a database hosting the map.

11. The vehicle of claim 10, wherein annotating the map further comprises:
transmitting at least one of a number of times that the object has been observed, a frequency that the object has been observed, or a date and time of observing the object to the database for determining the confidence level of the merged information actually representing the object.

12. The vehicle of claim 1, wherein the at least one processor is further configured to carry out operations including: updating an existing instance of the object on a map based on the merged information.

13. The vehicle of claim 1, wherein the at least one processor is further configured to carry out operations including: determining at least one geometric feature of the object based on the merged information.

14. The vehicle of claim 13, wherein determining the at least one geometric feature of the object comprises determining one of at least one edge of the object, at least one surface of the object, or size of the object.

15. The vehicle of claim 1, wherein the at least one camera acquires the camera information and the at least one LiDAR device acquires the LiDAR information concurrently.

16. The vehicle of claim 1, wherein the at least one camera acquires the camera information after the at least one LiDAR device acquires the LiDAR information.

17. The vehicle of claim 16, wherein a timing difference between when the at least one camera acquires the camera information and the at least one LiDAR device acquires the LiDAR information is based on a velocity of the vehicle.

18. The vehicle of claim 1, wherein merging the at least one portion of the received LiDAR information with the at least one pixel associated with the received object information comprises merging a plurality of LiDAR points within a bounding box of the camera information.

19. The vehicle of claim 1, wherein determining the confidence level of the merged information actually representing the object comprises determining the confidence level further based on additional information that comprises at least one of:
a number of times the object has been observed,
a number of times the object has been observed within a predetermined number of days,
a date and time of observing the object, or
an observation frequency of the object.

20. The vehicle of claim 1, wherein the operations further comprise:
in response to determine that at least one of the accuracy or the confidence level is below a corresponding threshold, determining that a second look is warranted and controlling or instructing to control at least one of:
a zoom feature of the at least one camera or a second camera system to zoom-in on the object,
panning an area of the object based on at least one of the camera information or the merged information,
a zoom feature of the at least one LiDAR device or a second LiDAR system to zoom-in on the object, or
panning an area of the object based on at least one of the LiDAR information or the merged information.

21. A method comprising:
receiving LiDAR information from at least one LiDAR device of a vehicle;
receiving object information of an object proximate to the vehicle based on camera information from at least one camera, the object information comprising at least one pixel of the camera information representing the object and the object information comprising categorization information representing a classification of the object that indicates a category or a type of the object;
determining if the categorization information of the object is associated with a traffic instruction; and
in accordance with determining that the categorization information of the object is associated with the traffic instruction:
merging at least one portion of the received LiDAR information with at least one pixel associated with the received object information to generate merged information representing the object;
determining a location of the object relative to the vehicle based on the merged information representing the object or a combination of the LiDAR information and the camera information;
determining an accuracy of the object based on at least one of a number of pixels associated with the object, the location of the object relative to the vehicle, or the merged information representing the object;
determining a confidence level of the merged information actually representing the object based on the accuracy of the object, the confidence level representing how confident the vehicle is that the object proximate to the vehicle is in fact the object actually represented by the merged information; and
operating the vehicle based on (i) the location of the object relative to the vehicle and (ii) the confidence level of the merged information actually representing the object.

22. A non-transitory computer-readable storage medium comprising at least one program for execution by at least one processor of a first device, the at least one program including instructions which, when executed by at least one processor, cause the first device to perform operations comprising:
receiving LiDAR information from at least one LiDAR device of a vehicle;
receiving object information of an object proximate to the vehicle based on camera information from at least one camera, the object information comprising at least one pixel of the camera information representing the object and the object information comprising categorization information representing a classification of the object that indicates a category or a type of the object;
determining if the categorization information of the object is associated with a traffic instruction; and
in accordance with determining that the categorization information of the object is associated with the traffic instruction:
merging at least one portion of the received LiDAR information with at least one pixel associated with the received object information to generate merged information representing the object;
determining a location of the object relative to the vehicle based on the merged information representing the object or a combination of the LiDAR information and the camera information;
determining an accuracy of the object based on at least one of a number of pixels associated with the object, the location of the object relative to the vehicle, or the merged information representing the object;
determining a confidence level of the merged information actually representing the object based on the accuracy of the object, the confidence level representing how confident the vehicle is that the object proximate to the vehicle is in fact the object actually represented by the merged information; and
operating the vehicle based on (i) the location of the object relative to the vehicle and (ii) the confidence level of the merged information actually representing the object.

* * * * *